(12) United States Patent
Kubota

(10) Patent No.: US 9,232,093 B2
(45) Date of Patent: Jan. 5, 2016

(54) INFORMATION PROCESSING APPARATUS, SYSTEM, AND METHOD

(71) Applicant: Hajime Kubota, Kanagawa (JP)

(72) Inventor: Hajime Kubota, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/557,547

(22) Filed: Dec. 2, 2014

(65) Prior Publication Data

US 2015/0156353 A1   Jun. 4, 2015

(30) Foreign Application Priority Data

Dec. 4, 2013 (JP) ................. 2013-251076

(51) Int. Cl.
*H04N 1/00* (2006.01)

(52) U.S. Cl.
CPC ....... *H04N 1/00408* (2013.01); *H04N 1/00076* (2013.01); *H04N 2201/0094* (2013.01)

(58) Field of Classification Search
USPC ....................................................... 358/1.14
See application file for complete search history.

(56) References Cited

U.S. PATENT DOCUMENTS

| 2008/0052710 A1* | 2/2008 | Iwai | G06F 21/305 718/100 |
| 2010/0231946 A1* | 9/2010 | Shozaki | H04N 1/00241 358/1.13 |

FOREIGN PATENT DOCUMENTS

| JP | 2009-223577 | 10/2009 |
| JP | 2012-044258 | 3/2012 |

* cited by examiner

*Primary Examiner* — Ngon Nguyen
(74) *Attorney, Agent, or Firm* — IPUSA, PLLC

(57) ABSTRACT

An information processing apparatus includes a notification part, a request part, and a display part. The notification part transmits information for determining whether to display an error display screen to an application in execution installed in the information processing apparatus, in response to reception of a notification of an error during the execution of the application. The request part requests display of the error display screen in response to reception of a display request, the display request being transmitted from the application in execution in response to reception of the information from the notification part. The display part displays the error display screen in response to the request by the request part.

11 Claims, 18 Drawing Sheets

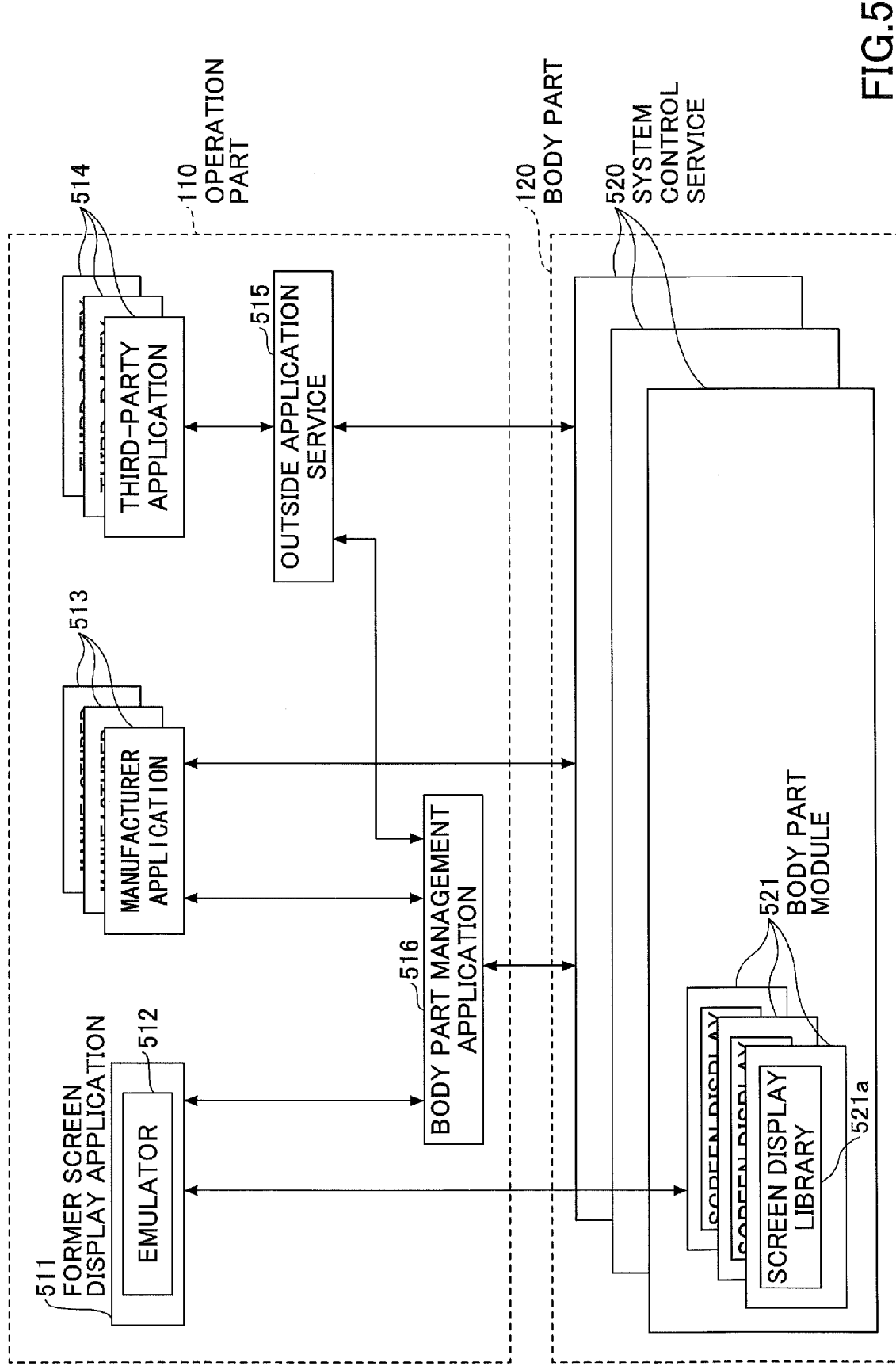

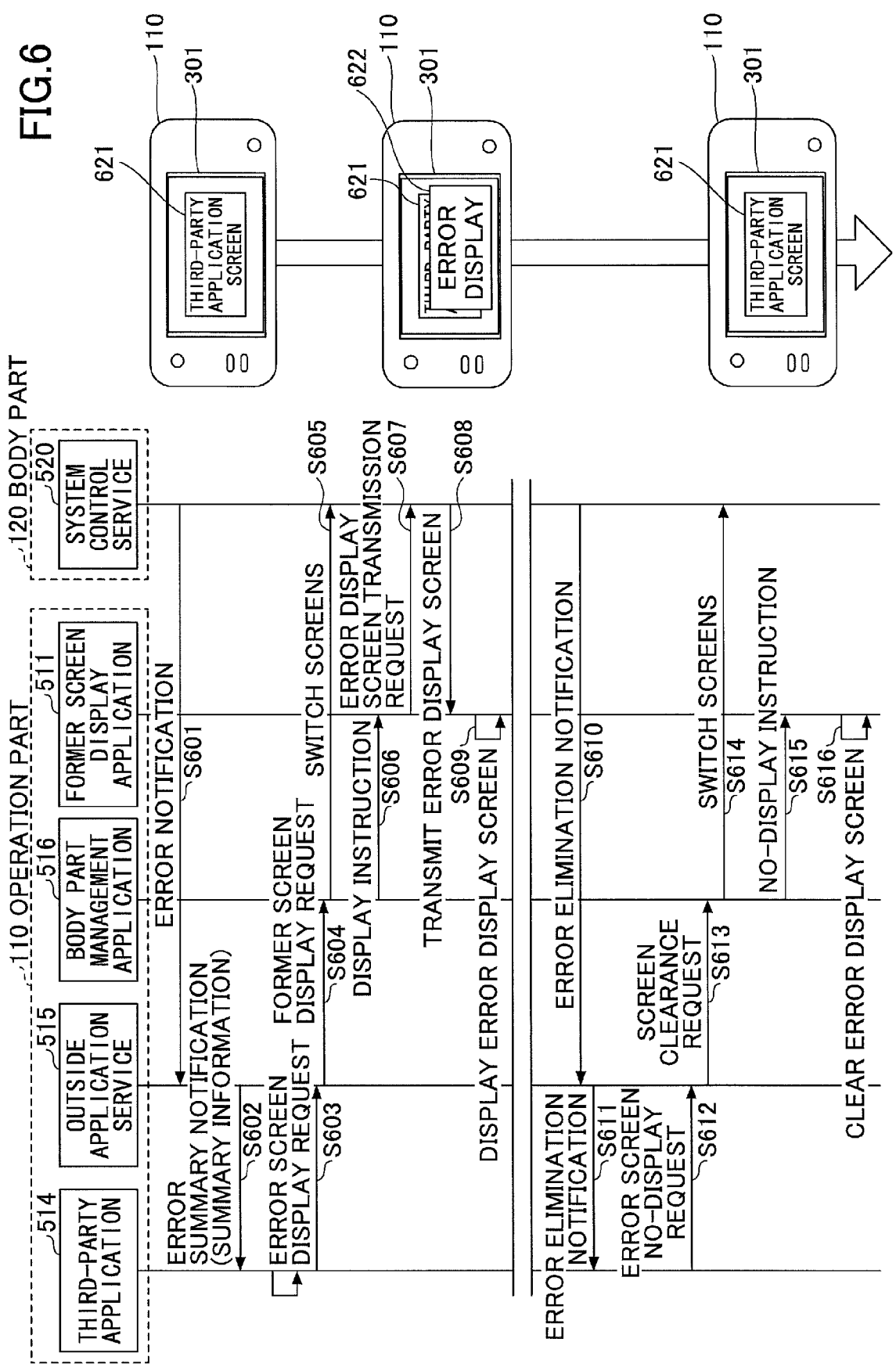

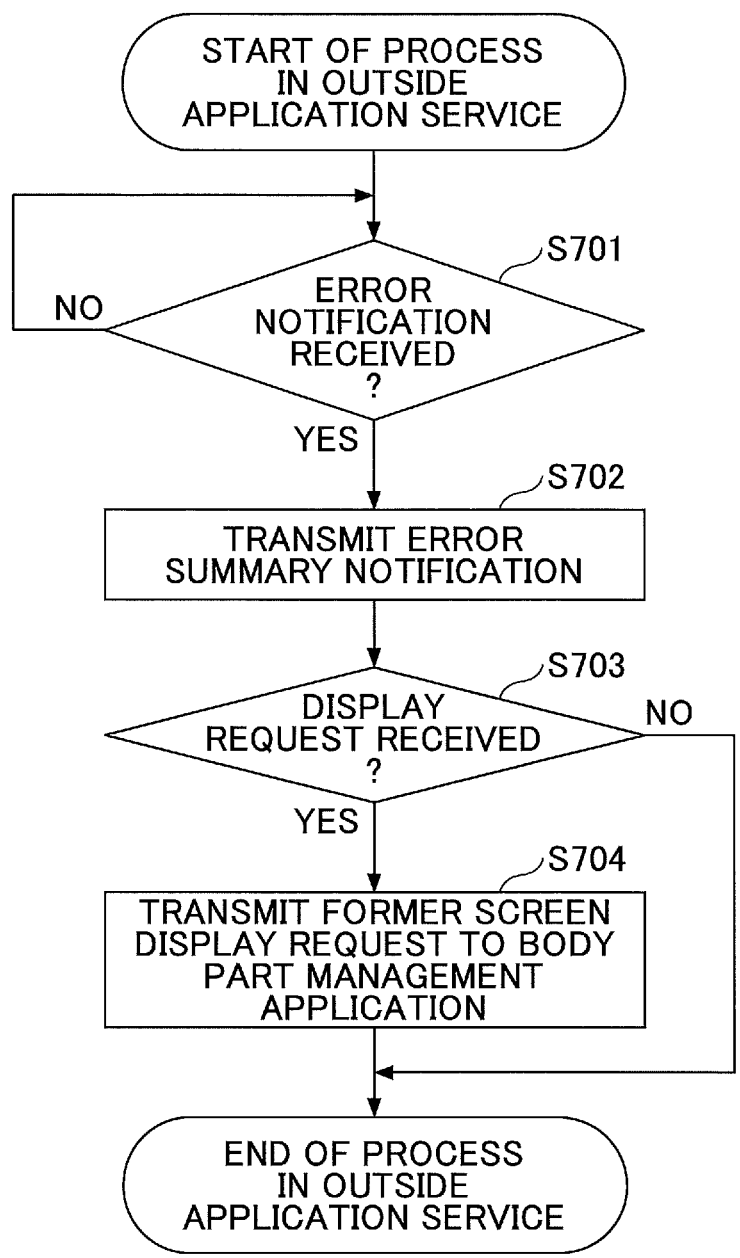

FIG.8

| SUMMARY INFORMATION | DETAILED INFORMATION |
|---|---|
| STOP (MEMORY FULL) | – |
| STOP (JOB FULL) | ・WAITING JOB INFORMATION |
| CANCEL | ・USER INSTRUCTION<br>・AUTO CANCELLATION<br>　(AUTOMATIC AT ERROR TIME)<br>・AUTO CANCELLATION (MEMORY FULL) |
| PENDING<br>(AWAITING JOB START) | – |
| PENDING<br>(AWAITING RESOURCE) | ・SCANNER IN USE<br>・MANUAL TRAY IN USE<br>・STAPLER IN USE |
| SUSPEND<br>(READING PAPER JAM) | ・PAPER JAM POSITION<br>　(ADF: PAPER FEED COVER)<br>・PAPER JAM POSITION<br>　(ADF: LOWER CONVEYANCE PART) |
| SUSPEND<br>(PRINTING PAPER JAM) | ・PAPER JAM POSITION (RIGHT-SIDE COVER)<br>・PAPER JAM POSITION (TRANSFER)<br>・PAPER JAM POSITION (SCREEN)<br>・PAPER JAM POSITION (TRAY 1)<br>・PAPER JAM POSITION<br>　(FINISHER A UPPER COVER)<br>... |
| SUSPEND<br>(OUT OF PAPER) | ・TRAY 1<br>・TRAY 2<br>・TRAY 3<br>... |
| SUSPEND<br>(SUPPLIES) | ・TONER END (BLACK)<br>・TONER END (CYAN)<br>...<br>・WASTE TONER BOTTLE FULL |
| FAILURE | ・SERVICE CALL No. xxxx<br>・FINISHER A<br>・TRAY<br>... |

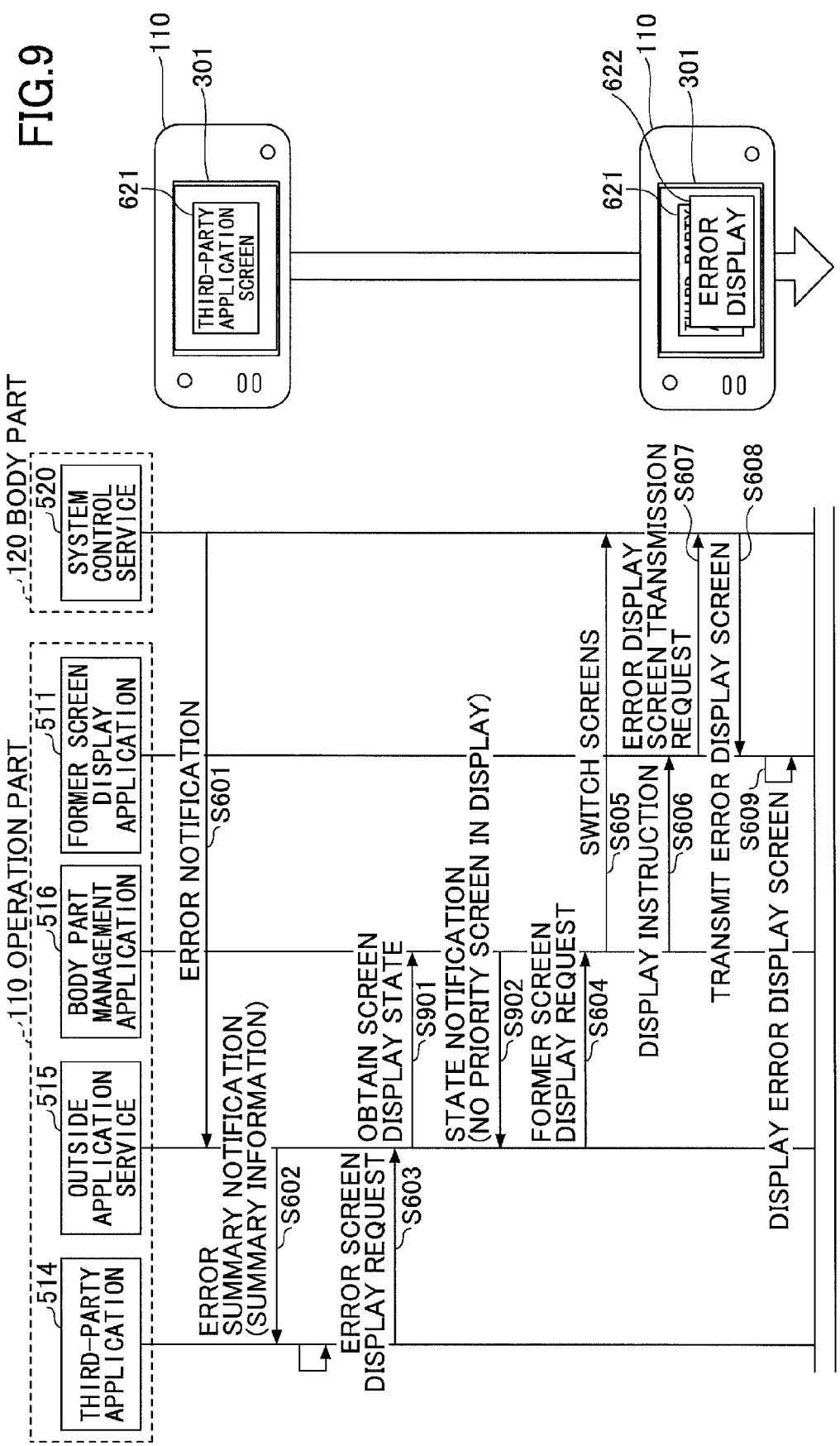

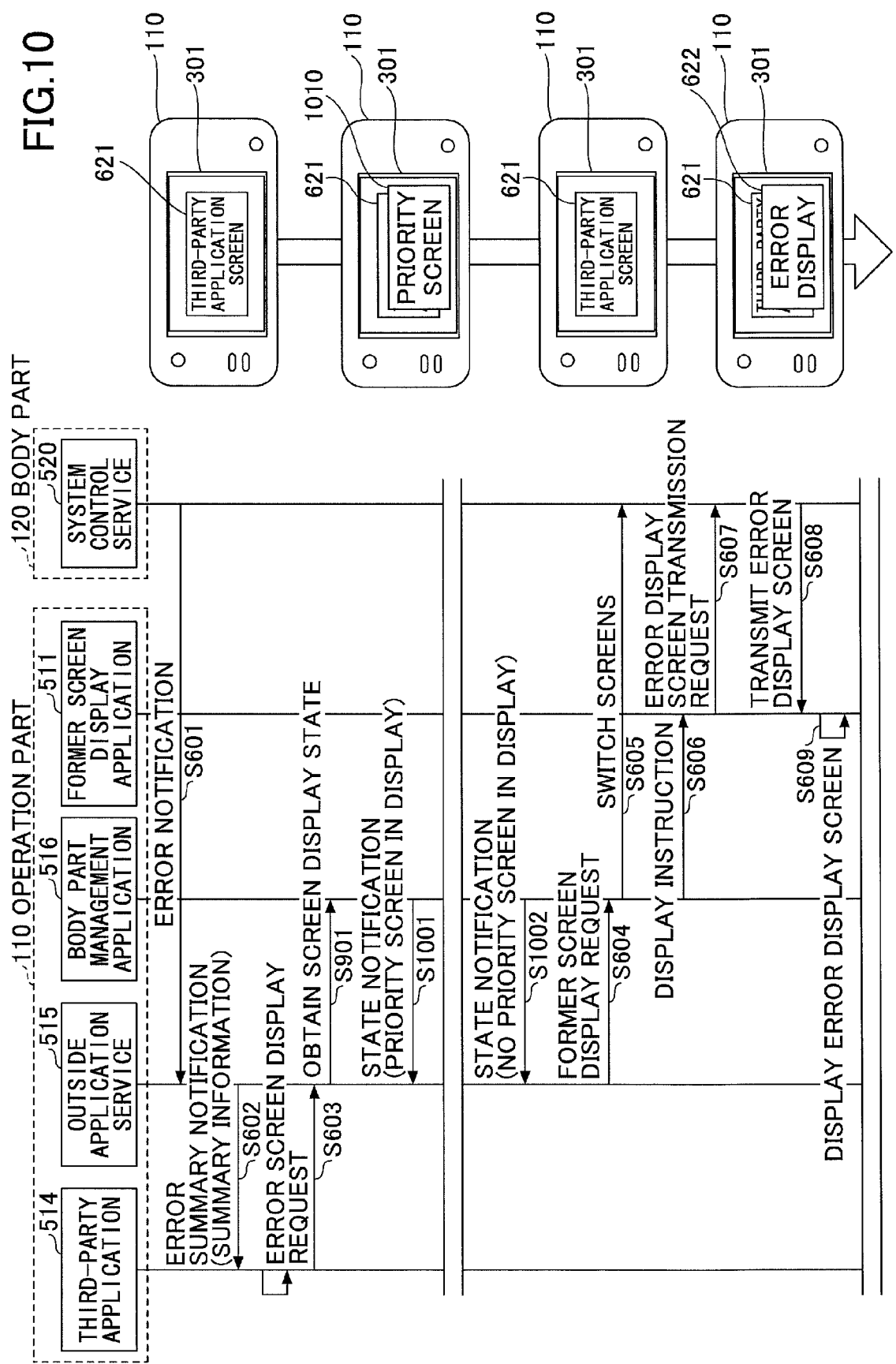

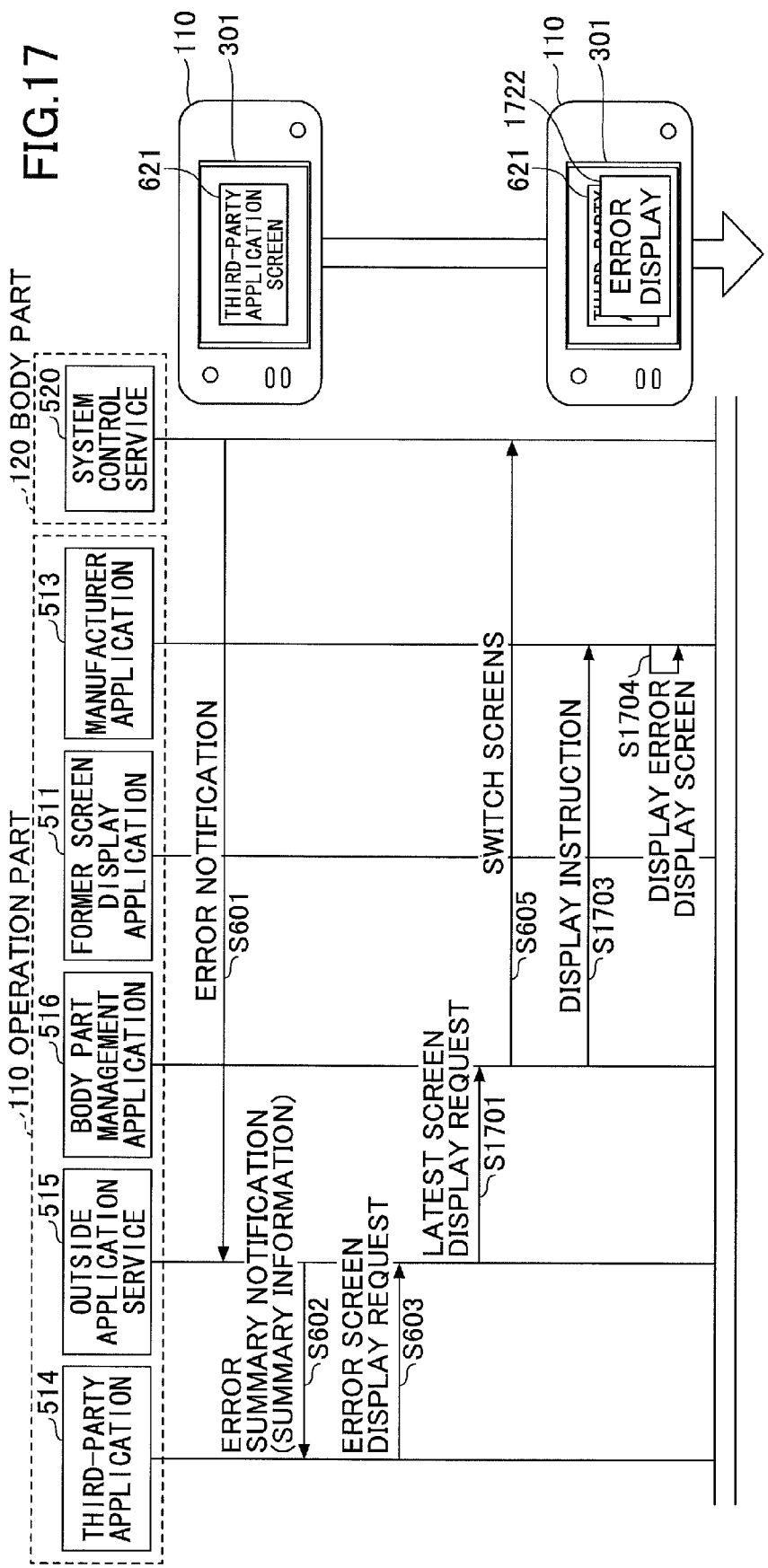

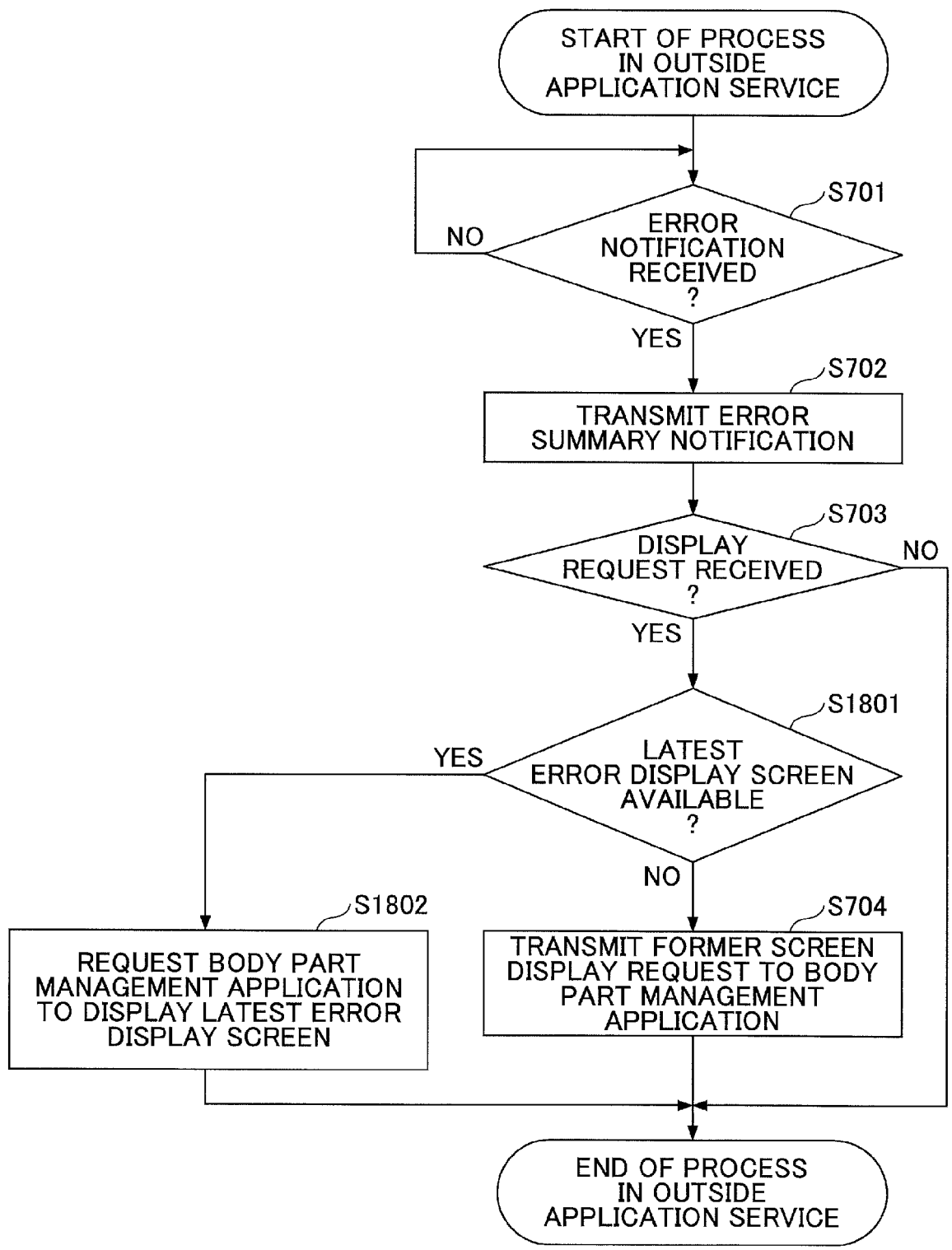

INFORMATION PROCESSING APPARATUS, SYSTEM, AND METHOD

CROSS-REFERENCE TO RELATED APPLICATION

The present application is based upon and claims the benefit of priority of Japanese Patent Application No. 2013-251076, filed on Dec. 4, 2013, the entire contents of which are incorporated herein by reference.

BACKGROUND OF THE INVENTION

1. Field of the Invention

The present invention relates to information processing apparatuses, systems, and methods.

2. Description of the Related Art

Interfaces for installing external application programs in image processing apparatuses such as multifunction peripheral (MFP)s have been released to the public by manufacturers of image processing apparatuses. Providing such an environment makes it possible for third-party vendors as well as manufacturers of image processing apparatuses to develop application programs for image processing apparatuses. As a result, it is possible to enhance the functions of image processing apparatuses.

On the other hand, manufacturers of image processing apparatuses have made efforts to reduce development costs by using, also for new models, functions (such as an error display function) and display screens (such as an error display screen) provided in former models when developing new models, and configurations for achieving this have also been proposed. (See, for example, Japanese Laid-Open Patent Applications No. 2012-044258 and No. 2009-223577.)

SUMMARY OF THE INVENTION

According to an aspect of the present invention, an information processing apparatus includes a notification part, a request part, and a display part. The notification part transmits information for determining whether to display an error display screen to an application in execution installed in the information processing apparatus, in response to reception of a notification of an error during the execution of the application. The request part requests display of the error display screen in response to reception of a display request, the display request being transmitted from the application in execution in response to reception of the information from the notification part. The display part displays the error display screen in response to the request by the request part.

According to an aspect of the present invention, an information processing system, which includes multiple apparatuses connected so as to communicate with each other, includes a notification part, a request part, and a display part. The notification part transmits information for determining whether to display an error display screen to an application in execution installed in one of the apparatuses, in response to reception of a notification of an error during the execution of the application. The request part requests display of the error display screen in response to reception of a display request, the display request being transmitted from the application in execution in response to reception of the information from the notification part. The display part displays the error display screen in response to the request by the request part.

According to an aspect of the present invention, an information processing method in an information processing apparatus includes transmitting information for determining whether to display an error display screen to an application in execution installed in the information processing apparatus, in response to reception of a notification of an error during the execution of the application. The information processing method further includes requesting display of the error display screen in response to reception of a display request, the display request being transmitted from the application in execution in response to reception of the transmitted information. The information processing method further includes displaying the error display screen in response to requesting the display of the error display screen.

The object and advantages of the embodiments will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIG. 5 is a diagram illustrating a functional configuration of an error display function in the operation and the body part according to the first embodiment;

FIG. 6 is a sequence diagram depicting a flow of an error display process in the image processing apparatus according to the first embodiment;

FIG. 7 is a flowchart illustrating a flow of a process in an outside application service of the operation part at the time of the execution of the error display process according to the first embodiment;

FIG. 8 is a diagram illustrating summary information and detailed information included in an error notification according to the first embodiment;

FIG. 9 is a sequence diagram depicting a flow of an error display process in the image processing apparatus according to a second embodiment;

FIG. 10 is a sequence diagram depicting another flow of the error display process in the image processing apparatus according to the second embodiment;

FIG. 17 is a sequence diagram depicting a flow of an error display process in the image processing apparatus according to a sixth embodiment; and FIG. 18 is a flowchart illustrating a flow of a process in the outside application service of the operation part at the time of the execution of the error display process according to the sixth embodiment.

DETAILED DESCRIPTION OF THE PREFERRED EMBODIMENTS

Figure 1:
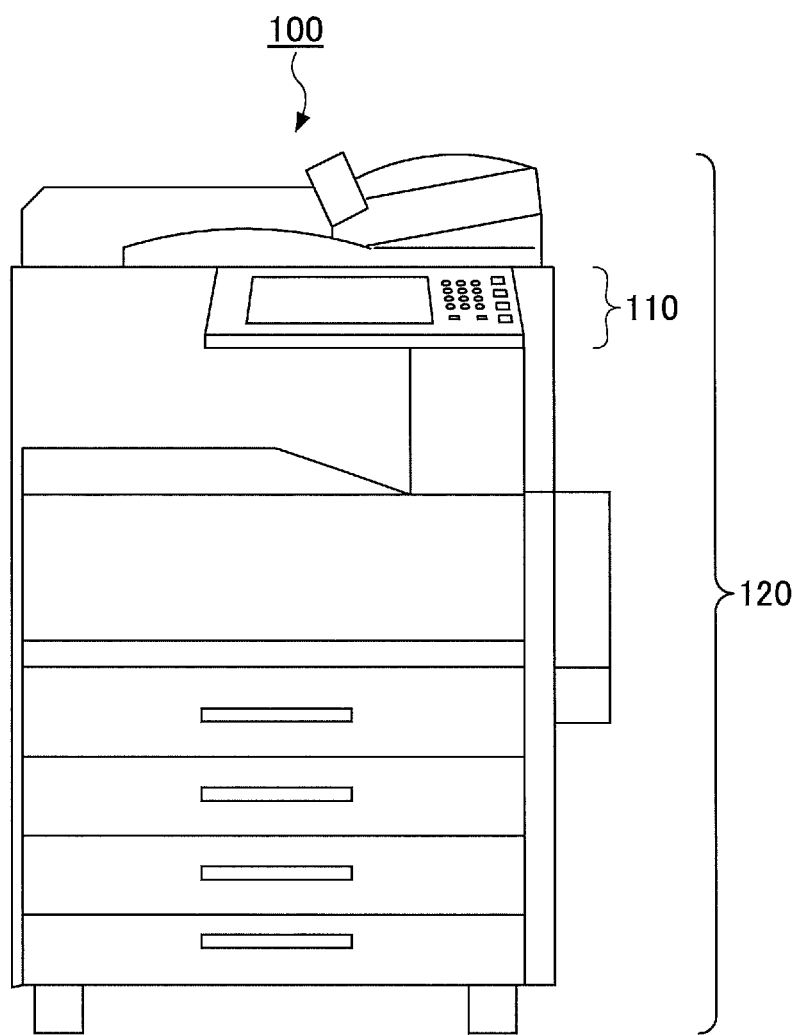
FIG. 1 is a diagram illustrating an exterior configuration of an image processing apparatus that includes an operation part according to a first embodiment.

As described above, manufacturers of image processing apparatuses have made efforts to reduce development costs by using functions and display screens provided in former models for new models when developing new models. In this respect, if it is possible to use functions and display screens provided in the former and the new models of image processing apparatuses also for application programs developed by third-party vendors, it is possible to reduce the development costs of the application programs of third-party vendors.

In using these functions and display screens, however, third-party vendor developers are required to learn all information on the details of operations of image processing apparatuses and information on authorities to use operation parts, which imposes a high operational load on third-party vendor developers.

Therefore, manufacturers of image processing apparatuses that release interfaces to the public are desired to provide an environment that facilitates the development of application programs by third-party vendors by making it possible for third-party vendors to easily use functions and display screens in image processing apparatuses.

According to an aspect of the present invention, an environment that facilitates the development of application programs to be installed is provided in image processing apparatuses.

A description is given below, with reference to the accompanying drawings, of embodiments of the present invention. The following description is given of embodiments in which an information processing apparatus according to an aspect of the present invention is applied to an operation part of an image processing apparatus such as an MFP. These embodiments, however, are non-limiting embodiments, and the information processing apparatus according to an aspect of the present invention may alternatively be applied to components of an image processing apparatus other than the operation part, such as a body part.

Furthermore, the components of the information processing apparatus according to an aspect of the present invention may be applied separately to the operation part and the body part of an image processing apparatus (that is, to an information processing system in which multiple apparatuses are connected so as to be able to communicate with each other). Alternatively, the components of the information processing apparatus according to an aspect of the present invention may be applied together to an apparatus other than image processing apparatuses, or may be applied separately to components of the apparatus (that is, to an information processing system in which multiple apparatuses are connected so as to be able to communicate with each other).

In the specification and drawings, elements having substantially the same functional configuration are referred to by the same reference numeral, and are not repetitively described.

[First Embodiment]

First, a description is given of an exterior configuration of an image processing apparatus that includes an operation part (information processing apparatus) according to a first embodiment. FIG. 1 is a diagram illustrating an exterior configuration of an image processing apparatus 100 that includes an operation part (information processing apparatus) according to this embodiment.

The image processing apparatus 100 is an MFP and includes image processing functions such as a copy function, a scanner function, a facsimile (FAX) function, and a printer function. Furthermore, the image processing apparatus 100 includes various functions including functions related to the image processing functions (such as an error display function).

Furthermore, referring to FIG. 1, the image processing apparatus 100 includes an operation part 110 and a body part 120.

The operation part 110 is used when a user performs various operations such as selection of an image processing function to be executed by the body part 120, inputting of various setting values for executing an image processing function, and inputting of an execution command for executing an image processing function.

The body part 120 executes information processing for implementing image processing functions and various functions including functions related to the image processing functions (such as an error display function), based on a user's various operations on the operation part 110.

Figure 2:
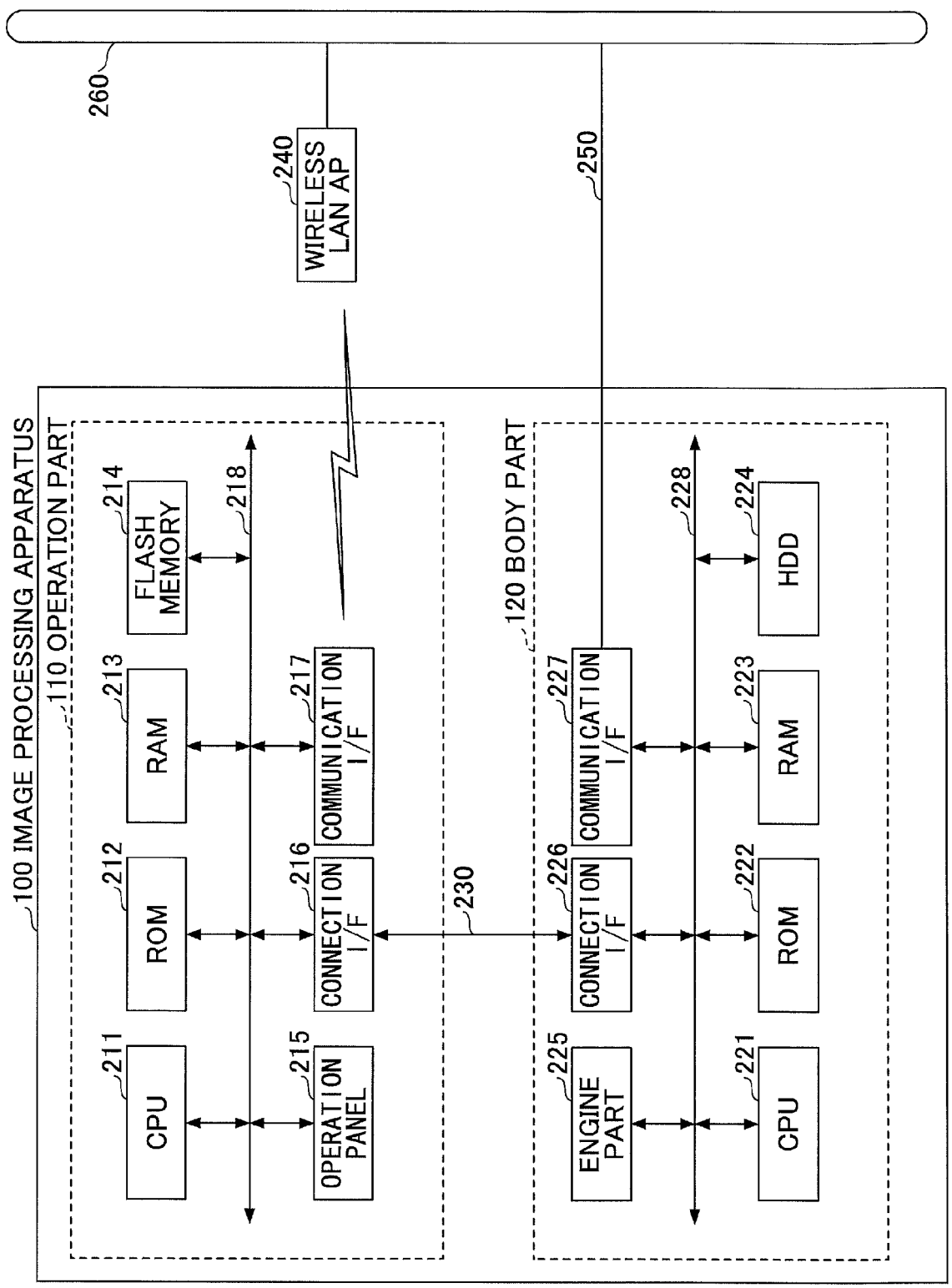
FIG. 2 is a diagram illustrating a hardware configuration of the operation part and a hardware configuration of a body part of the image processing apparatus according to the first embodiment.

Next, a description is given of a hardware configuration of the operation part 110 and a hardware configuration of the body part 120 of the image processing apparatus 100. FIG. 2 is a diagram illustrating a hardware configuration of the operation part 110 and a hardware configuration of the body part 120 of the image processing apparatus 100.

Referring to FIG. 2, the operation part 110 includes a central processing unit (CPU) (computer) 211, a read-only memory (ROM) 212, a random access memory (RAM) 213, a flash memory 214, an operation panel 215, a connection interface (I/F) 216, and a communication I/F 217, all of which are interconnected by a bus 218.

The CPU 211 controls the entire operation part 110 and implements various functions (including an error display function to be described below) by executing various programs stored in the ROM 212 or the flash memory 214 using the RAM 213 as a work area.

The flash memory 214 is a non-volatile storage medium and stores various programs executed by the CPU 211 and various data.

The operation panel 215 includes a display and operation part and hardware keys for a user to perform various operations with. The display and operation part of the operation panel 215 is configured to display internal states (such as an error state) of the image processing apparatus 100.

The connection I/F 216 is an interface for communicating with the body part 120 through a communication channel 230. Here, a USB (universal serial bus) interface is used as the connection I/F 216.

The communication I/F 217 is an interface for communicating with external apparatuses via a network. In the case illustrated in FIG. 2, the communication I/F 217 establishes a radio connection with a wireless LAN (local area network) access point (AP) 240 so as to communicate with external apparatuses via a network 260.

The body part 120 includes a CPU (computer) 221, a ROM 222, a RAM 223, a hard disk drive (HDD) 224, an engine part 225, a connection I/F 226, and a communication I/F 227, all of which are interconnected by a bus 228.

The CPU 221 controls the entire body part 120 and implements various functions (including the error display function) by executing various programs stored in the ROM 222 or the HDD 224 using the RAM 223 as a work area.

The HDD 224 is a non-volatile storage medium and stores various programs executed by the CPU 221 and various data.

The engine part 225 is a hardware item that performs information processing for implementing image processing functions such as a copy function, a scanner function, a facsimile function, and a printer function. The engine part 225 includes, for example, a scanner that scans and reads an object (original) such as a document, a plotter that performs printing on a sheet material such as paper, and a communication part that performs facsimile communications. The engine part 225 may further include a finisher that sorts sheet materials subjected to printing and/or an automatic document feeder (ADF) that automatically feeds the object.

The connection I/F 226 is an interface for communicating with the operation part 110 via the communication channel 230. Here, a USB interface is used as the connection I/F 226.

The communication I/F 227 is an interface for communicating with external apparatuses via a network. In the case of FIG. 2, the communication I/F 227 is connected to the network 260 via a wire line 250.

Figure 3:
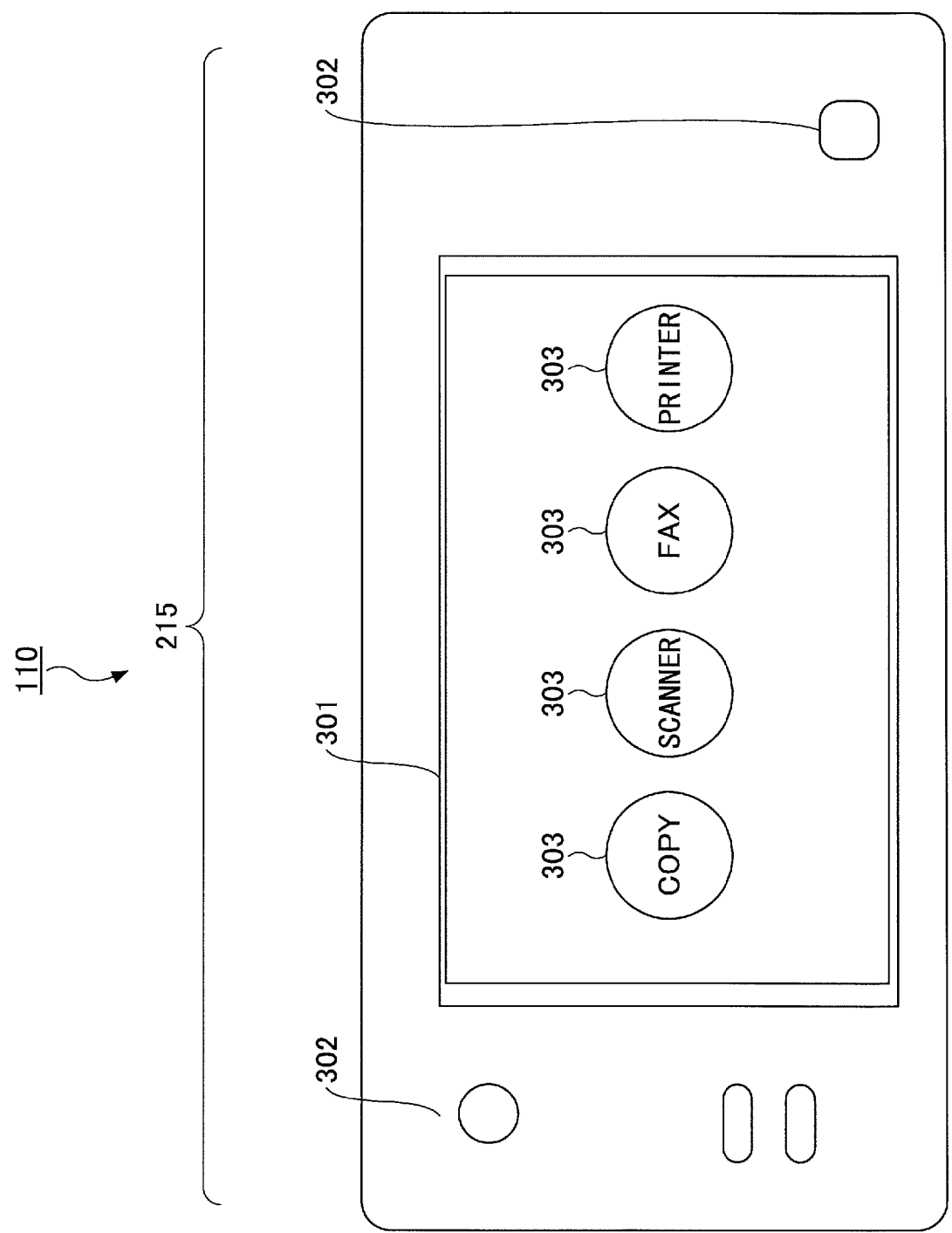
FIG. 3 is a diagram illustrating an exterior configuration of an operation panel according to the first embodiment.

Next, a description is given of an exterior configuration of the operation panel 215 of the operation part 110. FIG. 3 is a diagram illustrating an exterior configuration of the operation panel 215 of the operation part 110.

Referring to FIG. 3, the operation panel 215 includes a display and operation part 301 and hard keys 302. The display and operation part 301 is a combination of a liquid crystal display (LCD) device and a touchscreen.

The LCD device of the display and operation part 301 displays various display screens. In the case of FIG. 3, a display screen for implementing image processing functions such as a copy function, a scanner function, a facsimile function, and a printer function is displayed. In response to selection of one of displayed icons 303 by a user, the touchscreen detects the position selected by the user, and an image processing function corresponding to the user's operation recognized based on the selected position is executed in the body part 120.

An error that occurs during the execution of an image processing function is transmitted to the operation part 110 in the form of error notification by the body part 120, and an error display screen corresponding to the transmitted error notification is displayed on the display and operation part 301.

Figure 4:
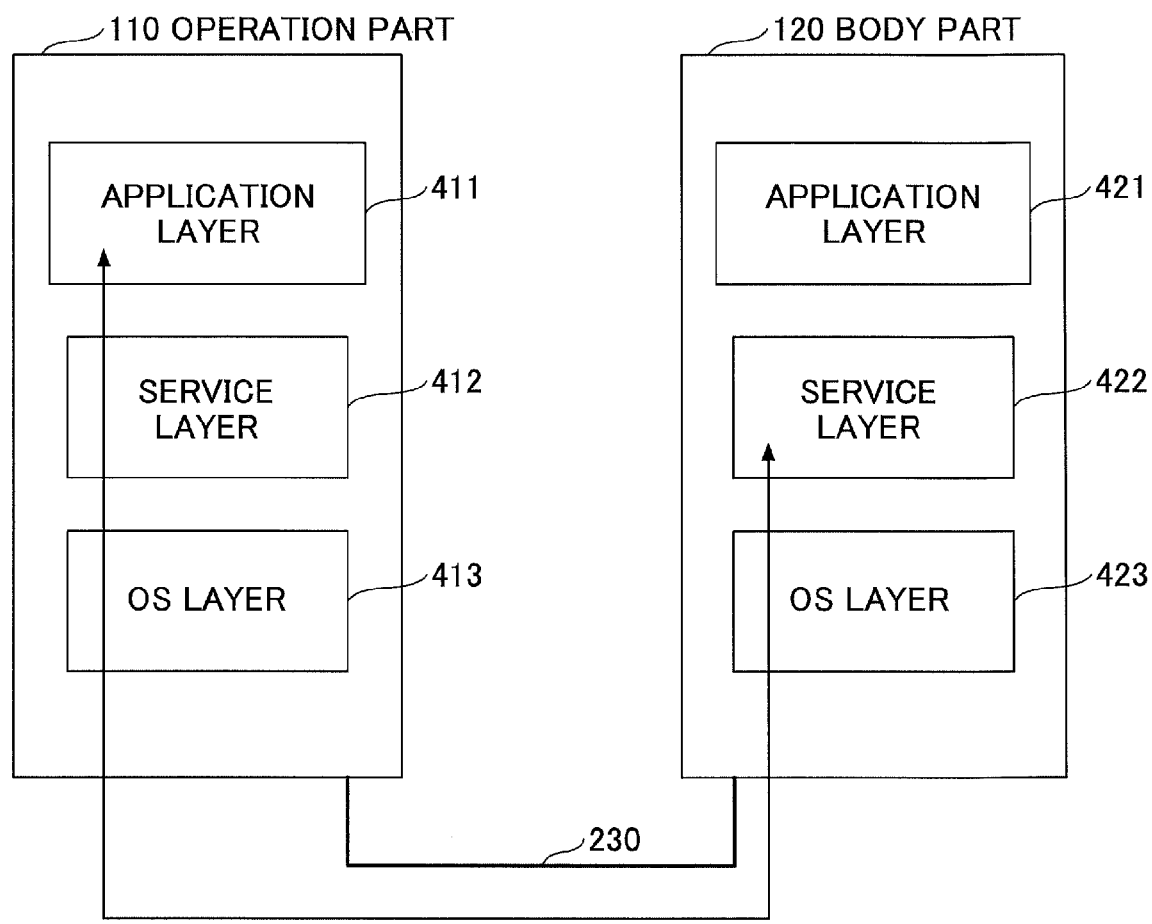
FIG. 4 is a diagram illustrating a hierarchical structure of a program group included in the operation part and a hierarchical structure of a program group included in the body part according to the first embodiment.

Next, a description is given of a hierarchical structure of a program group included in the operation part 110 and a hierarchical structure of a program group included in the body part 120. FIG. 4 is a diagram illustrating a hierarchical structure of a program group included in the operation part 110 (the ROM 212 and the flash memory 214) and a hierarchical structure of a program group included in the body part 120 (the ROM 222 and the HDD 224).

First, a description is given of a hierarchical structure of a program group included in the body part 120 (the ROM 222 and the HDD 224). The program group included in the body part 120 may be roughly divided into an application layer 421, a service layer 422, and an OS layer 423. Programs for causing hardware resources to operate to implement image processing functions are classified into the application layer 421. Examples of such programs include a copy application, a scanner application, a facsimile application, and a printer application.

Programs intervening between the application layer 421 and the OS layer 423 are classified into the service layer 422. Such programs serve as interfaces for programs of the application layer 421 using hardware resources provided in the body part 120 and for reporting the statuses of hardware resources provided in the body part 120 to the application layer 421.

For example, the service layer 422 receives requests to hardware resources for their operations and arbitrates between the received operation requests. Furthermore, the service layer 422 transmits errors detected in hardware resources to the application layer 421 in the form of error notification. Examples of operation requests received by the service layer 422 include operation requests for reading by a scanner and printing by a plotter.

The programs classified into the service layer 422 serve as interfaces as described above for an application layer 411 of the operation part 110 as well. That is, programs classified into the application layer 411 of the operation part 110 also may cause hardware resources of the body part 120 to operate to implement image processing functions by accessing the service layer 422.

Programs referred to as basic software are classified into the OS layer 423. The OS layer 423 provides basic functions for controlling hardware resources provided in the body part 120. The programs classified into the service layer 422 convert operation requests to hardware resources from programs classified into the application layer 421 into commands interpretable by the OS layer 423, and pass the commands to the OS layer 423. The programs classified into the OS layer 423 execute the commands to implement image processing functions in accordance with the operation requests to hardware resources. Furthermore, as a result of execution of the programs classified into the OS layer 423, the OS layer 423 receives errors detected in hardware resources and passes the received errors to the service layer 422 that transmits the errors to the application layer 421 in the form of error notification.

Next, a description is given of a hierarchical structure of a program group included in the operation part 110 (the ROM 212 and the flash memory 214). Like in the body part 120, the program group included in the operation part 110 may be roughly divided into the application layer 411, a service layer 412, and an OS layer 413.

Functions provided by the programs classified into the application layer 411 and kinds of operation requests receivable by the service layer 412, however, are different from those of the body part 120. The programs classified into the application layer 411 basically provide a user interface function for performing operation or display related to image processing functions provided by the body part 120.

It is assumed that the OS of the operation part 110 and the OS of the body part 120 operate independent of each other according to this embodiment. Furthermore, the OS of the operation part 110 and the OS of the body part 120 do not have to be of the same type on condition that it is possible for the operation part 110 and the body part 120 to communicate with each other. For example, the operation part 110 may use Android® and the body part 120 may use Linux®.

Thus, the operation part 110 and the body part 120 may be controlled by different OSs in the image processing apparatus 100. Therefore, communications between the operation part 110 and the body part 120 may be performed not as communications between processes in a single apparatus but as communications between different apparatuses.

Examples of such communications (performed as communications between different apparatuses) include operations of transmitting a user's various operations received by the operation part 110 to the main body part 120 (command communications) and operations of transmitting events that instruct the operation part 110 to display screens (for example, an error notification and an error elimination notification) by the body part 120.

Next, a description is given of a functional configuration of an error display function implemented in the image processing apparatus 100. It is assumed that, according to this embodiment, an error display function implemented by the image processing apparatus 100 is so configured as to use an error display function and an error display screen of another image processing apparatus (for example, a model older than the image processing apparatus 100).

FIG. 5 is a diagram illustrating a functional configuration of an error display function implemented in the image processing apparatus 100. In FIG. 5, of various functions implemented by the program groups roughly divided as illustrated in the hierarchical structures of FIG. 4, error display-related functions alone are extracted and illustrated.

Referring to FIG. 5, error display-related functions include a former screen display application 511, a manufacturer application 513, a third-party application 514, an outside application service 515, and a body part management application 516 of the operation part 110, and a system control service 520 of the body part 120.

The former screen display application 511 provides a function for displaying an error display screen of an image processing apparatus other than the image processing apparatus 100 (for example, a model older than the image processing apparatus 100). The former screen display application 511 includes an emulator 512.

The emulator 512 obtains an error display screen from a screen display library 521a of a body part module 521 of the system control service 520 of the body part 120, and converts the obtained error display screen into an error display screen suitable for display on the operation part 110.

The manufacturer application 513 is an application program provided by a manufacturer of the image processing apparatus 100. The manufacturer application 513 also includes an error display screen. While being capable of displaying the included error display screen, the manufacturer application 513 is also capable of using an error display screen of an image processing apparatus other than the image processing apparatus 100 (for example, a model older than the image processing apparatus 100). In this case, even during the execution of the manufacturer application 513, the former screen display application 511 is activated based on detailed information included in the error notification, so that an error display screen of the screen display library 521a retained by the system control service 520 is displayed.

Thus, by making it possible to use a former error display function and a former error display screen, it is possible for the manufacturer of the image processing apparatus 100 to reduce the cost of development of the manufacturer application 513.

The third-party application 514 is an application program provided and installed in the operation part 110 by a third-party vendor. In the operation part 110 of this embodiment, an interface related to application programs is available to the public, so that multiple third-party applications 514 may be installed by third-party vendors.

The outside application service 515 receives an error notification from the system control service 520, and transmits summary information (to be described in detail below) included in the error notification to the third-party application 514. Furthermore, in response to a request for display of an error screen from the third-party application 514, the outside application service 515 transmits the error screen display request from the third-party application 514 to the body part management application 516.

The body part management application 516 transmits and receives information to and from the system control service 520 of the body part 120. When an error occurs in the body part 120 during execution of the manufacturer application 513, an error notification is transmitted to the body part management application 516. Based on the received error notification, the body part management application 516 issues an instruction to switch display screens and an instruction to display an error display screen of the former screen display application 511 or the manufacturer application 513.

Furthermore, when receiving a request for display of an error display screen from the third-party application 514 as a result of the occurrence of an error in the body part 120 during execution of the third-party application 514, the body part management application 516 receives the display request. Then, in response to the display request, the body part management application 516 issues an instruction to switch display screens and an instruction to display an error display screen of the former screen display application 511.

Thus, the third-party application 514 provided by a third-party vendor performs notification for displaying an error display screen via the outside application service 515. At this point, the outside application service 515 transmits summary information included in the error notification. Therefore, the third-party vendor creates the third-party application 514 that determines the necessity or unnecessity of displaying an error display screen based on the summary information. That is, there is no need to create an error display function and an error display screen in developing the third-party application 514, so that it is possible to reduce the development cost of the third-party application 514. Furthermore, there is no need to learn detailed information concerning the operations of the image processing apparatus 100 or information related to authorities to use the operation part 110 (that is, it is sufficient to learn a summary information list).

Next, a description is given, with reference to FIG. 6, of a flow of an error display process in the image processing apparatus 100. FIG. 6 illustrates a sequence diagram depicting a flow of an error display process in the image processing apparatus 100 and a diagram depicting the contents of display of the display and operation part 301. It is assumed that an error has occurred in the body part 120 with the third-party application 514 being activated (that is, with a display screen 621 being displayed). In this case, at step S601, the system control service 520 of the body part 120 transmits an error notification to the outside application service 515.

In response to reception of the error notification, the outside application service 515 extracts summary information included in the received error notification. The summary information is information for enabling the third-party application 514 to determine the necessity or unnecessity of displaying an error display screen, and gives an overview of the error. Then, at step S602, the outside application service 515 transmits an error summary notification including the summary information to the running third-party application 514.

In response to reception of the error summary notification, the third-party application 514 recognizes the outline of the error and determines whether it is necessary to display an error display screen based on the summary information included in the error summary notification. It is the third-party application 514 that performs a determination as to whether it is necessary to display an error display screen in response to the recognized outline of the error. For example, if the error relates to an image processing function that the third-party application 514 is going to cause (or is causing) the body part 120 to execute, the third-party application 514 determines that it is necessary to display an error display screen, and if not, the third-party application 514 determines that it is unnecessary to display an error display screen.

It is assumed that the third-party application 514 is configured to transmit an error screen display request to the outside application service 515 in response to determining that it is necessary to display an error display screen.

Therefore, after transmitting the error summary notification, the outside application service 515 waits for a certain time in order to determine whether an error screen display request has been received. In the case of receiving an error screen display request at step S603, at step S604, the outside application service 515 transmits a former screen display request to the body part management application 516.

In response to reception of the former screen display request, at step S605, the body part management application 516 transmits an instruction to switch display screens to the system control service 520 of the body part 120. Furthermore, at step S606, the body part management application 516 instructs the former screen display application 511 to perform display.

In response to reception of the display instruction, at step S607, the former screen display application 511 transmits a request for transmission of an error display screen corresponding to the error notification to the system control service 520 of the body part 120.

In response to reception of the request for transmission of an error display screen, at step S608, the system control service 520 transmits an error display screen of the screen display library 521a to the former screen display application 511. The system control service 520, to which the instruction to switch display screens has been transmitted, manages the switching of display screens that has been performed.

In response to reception of the error display screen, at step S609, the former screen display application 511 displays the received error display screen (an error display screen 622 in FIG. 6) in place of the display screen 621 of the third-party application 514.

On the other hand, when the elimination of the error is detected in the body part 120, at step S610, the system control service 520 of the body part 120 transmits an error elimination notification to the outside application service 515.

In response to reception of the error elimination notification, at step S611, the outside application service 515 transfers the error elimination notification to the third-party application 514. It is assumed that the third-party application 514 is configured to transmit a Stop Display request that requests the error display screen to disappear to the outside application service 515 in response to reception of the error elimination notification.

In response to reception of the Stop Display request that requests the error display screen to disappear at step S612, at step S613, the outside application service 515 transmits a Clear Screen request to the body part management application 516.

In response to reception of the Clear Screen request, at step S614, the body part management application 516 transmits an instruction to switch display screens to the system control service 520 of the body part 120. Furthermore, at step S615, the body part management application 516 transmits a Stop Display instruction to the former screen display application 511.

In response to reception of the Stop Display instruction, at step S616, the former screen display application 511 clears the error display screen corresponding to the eliminated error. As a result, the state before the occurrence of the error (that is, the state where the display screen 621 of the third-party application 524 is displayed) returns. Furthermore, the system control service 520, to which the instruction to switch display screens has been transmitted, manages the switching of display screens that has been performed.

Next, a description is given of a flow of a process in the outside application service 515 at the time of the execution of the above-described error display process. FIG. 7 is a flowchart illustrating a flow of a process in the outside application service 515 at the time of the execution of the above-described error display process.

At step S701, it is determined whether an error notification has been transmitted from the system control service 520 of the body part 120. If it is determined at step S701 that no error notification has been transmitted (NO at step S701), the outside application service 515 waits for transmission of an error notification. On the other hand, if it is determined that an error notification has been transmitted (YES at step S701), the process proceeds to step S702.

At step S702, the outside application service 515 extracts summary information included in the received error notification, and identifies the third-party application 514 that is running at the time of the reception of the error notification. Furthermore, the outside application service 515 transmits an error summary notification including the extracted summary information to the identified third-party application 514.

FIG. 8 is a diagram illustrating an error notification received by the outside application service 515. Referring to FIG. 8, the error notification includes summary information that is information giving an overview of the error and detailed information that is information showing the details of the error. The summary information includes information indicating the occurrence of the error or information indicating the type of the error, and the detailed information includes information for specifying the error. For example, in the case of the occurrence of a paper jam at the right-side cover of the body part 120 during the execution of a print job, "Jam Position (Right-Side Cover)" is transmitted as the detailed information, and "Suspend (Printing Paper Jam)" is transmitted as the summary information.

The outside application service 515 then extracts "Suspend (Printing Paper Jam)" as the summary information included in the received error notification, and transmits the error summary notification to the third-party application 514.

Thus, the operation part 110 according to this embodiment operates so that the summary information is transmitted to the third-party application 514 in response to reception of an error notification.

Referring back to FIG. 7, at step S703, it is determined whether an error screen display request has been received from the third-party application 514. If it is determined at step S703 that an error screen display request has been received (YES at step S703), at step S704, the outside application service 515 transmits a former screen display request to the body part management application 516.

On the other hand, if it is determined at step S703 that no error screen display request has been received (NO at step S703), the process ends.

Thus, it is possible for the third-party application 514 installed in the operation part 110 according to this embodiment to display an error display screen on the operation part 110 by executing the following process alone when an error occurs in the body part 120: (a) determining whether it is necessary to display an error display screen based on the summary information, and (b) transmitting an error screen display request in response to determining that it is necessary to display an error display screen.

That is, the developer (third-party vendor) of the third-party application 514 is required to neither create an error display screen nor learn the detailed operation information of the image processing apparatus 100 or information on authorities to use the operation part 110 (that is, it is sufficient for the developer to determine the necessity or unnecessity of display based on the summary information). As a result, it is possible to reduce the operational load of the development of the error display of the third-party application 514 by the developer of the third-party vendor.

As is clear from the above description, according to the operation part (information processing apparatus) 110 of this embodiment, the summary information is transmitted to the third-party application 514 in response to the occurrence of an error, and an existing error display screen of the screen display library 521a is displayed using the former screen display application 511 in response to reception of a request for display of an error screen display from the third-party application 514.

As a result, with respect to the error display process, the developer of the third-party application 514 is relieved of the necessity to develop an error display screen, and it is sufficient for the developer of the third-party application 514 to create a program that determines whether it is necessary to display an error display screen based on the summary information and requests an error display screen to be displayed in response to determining that it is necessary to display an error display screen.

That is, according to this embodiment, it is possible to provide an environment that facilitates the development of application programs to be installed.

[Second Embodiment]

A description is given of a second embodiment. According to the above-described first embodiment, a former screen display request is immediately transmitted to the body part management application 516 in response to reception of an error screen display request from the third-party application 514. The present invention, however, is not limited to this configuration.

For example, a display screen presently displayed on the display and operation part 301 of the operation part 110 may be determined, and the presence or absence of a display screen higher in priority than the error display screen may be determined. Then, a former screen display request may be made in response to determining that a display screen higher in priority than the error display screen is not displayed. As a result, it is possible to avoid a situation where a display screen higher in priority is hidden by the error display screen. A description is given in detail below of the second embodiment.

First, a description is given of a flow of an error display process in the image processing apparatus 100 according to this embodiment. FIG. 9 illustrates a sequence diagram depicting a flow of an error display process in the image processing apparatus 100 and a diagram depicting the contents of display of the display and operation part 301. In the sequence diagram illustrated in FIG. 9, the process of steps S601 to S603 is the same as a corresponding process in FIG. 6. Accordingly, its description is omitted.

In response to reception of the error screen display request, at step S901, the outside application service 515 transmits a query about a present display state of a display screen to the body part management application 516. As a result of the query, at step S902, the outside application service 515 receives, from the body part management application 516, a state notification indicating whether a display screen higher in priority than the error display screen requested to be displayed is displayed.

In the case of FIG. 9, it is assumed that a state notification indicating that no display screen higher in priority than the error display screen requested to be displayed is displayed is received. In this case, at step S604, the outside application service 515 transmits a former display screen request to the body part management application 516.

The subsequent process of steps S605 to S609 is the same as a corresponding process in FIG. 6, and accordingly, its description is omitted.

Next, a description is given of another flow of the error display process in the image processing apparatus 100 according to this embodiment. FIG. 10 illustrates a sequence diagram depicting another flow of an error display process in the image processing apparatus 100 and a diagram depicting the contents of display of the display and operation part 301. FIG. 10 is different from FIG. 9 in that the state notification transmitted from the body part management application 516 indicates that a display screen 1010 higher in priority than the error display screen requested to be displayed is displayed (step S1001).

In the case of receiving state information indicating that the display screen 1010 higher in priority than the error display screen requested to be displayed is displayed, the outside application service 515 waits without transmitting a former screen display request.

Then, in response to receiving state information indicating that the display screen 1010 higher in priority than the error display screen requested to be displayed is not displayed (step S1002), at step S604, the outside application service 515 transmits a former display screen request to the body part management application 516.

Figure 11:
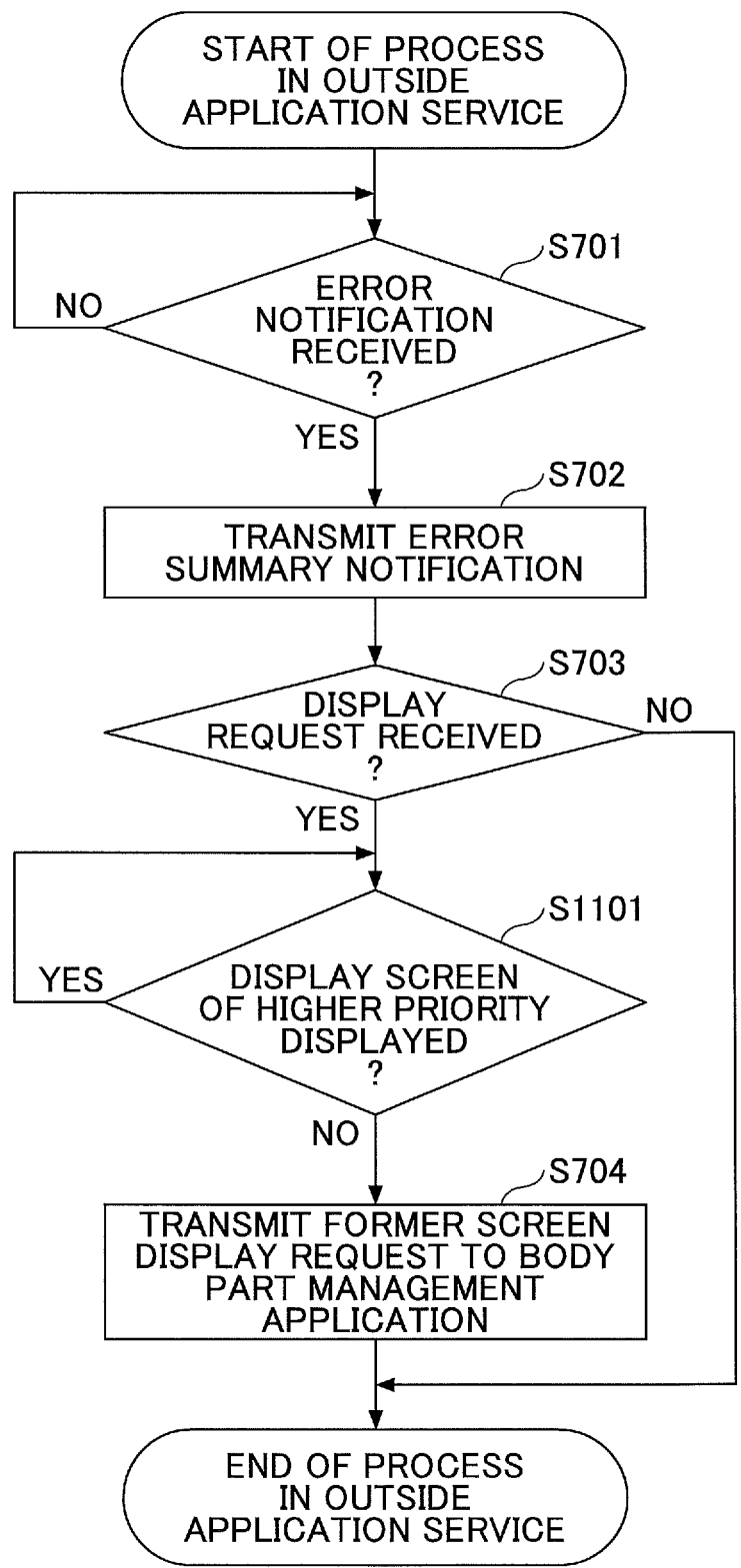
FIG. 11 is a flowchart illustrating a flow of a process in the outside application service of the operation part at the time of the execution of the error display process according to the second embodiment.

A description is given of a flow of a process in the outside application service 515 at the time of the execution of the error display process illustrated in FIGS. 9 and 10. FIG. 11 is a flowchart illustrating a flow of a process in the outside application service 515 at the time of the execution of the error display process illustrated in FIGS. 9 and 10.

In the flowchart illustrated in FIG. 11, the process of steps S701 to S703 is the same as a corresponding process in FIG. 7. Accordingly, its description is omitted.

In response to reception of the error screen display request from the third-party application 514, at step S1101, it is determined whether a display screen higher in priority than the error display screen requested to be displayed is displayed. For example, the outside application service 515 queries the body part management application 516 about a present display state of a display screen, and receives a state notification from the body part management application 516. If the received state notification indicates that a display screen higher in priority than the error display screen requested to be displayed is displayed, the outside application service 515 determines that a display screen higher in priority than the error display screen requested to be displayed is displayed, and waits.

If the received state notification indicates that no display screen higher in priority than the error display screen requested to be displayed is displayed, the outside application service 515 determines that no display screen higher in priority than the error display screen requested to be displayed is displayed, and the process proceeds to step S704.

At step S704, the outside application service 515 transmits a former screen display request to the body part management application 516.

As is clear from the above description, according to the operation part (information processing apparatus) 110 of this embodiment, compared with the above-described first embodiment, it is additionally determined, in response to reception of a request for display of an error display screen from the third-party application 514, whether a display screen higher in priority than the error display screen is displayed, and if a display screen of higher priority is displayed, an error screen display request is not made until the display of the display screen of higher priority ends, and an error screen display request is made after the display of the display screen of higher priority ends.

As a result, it is possible to avoid a situation where a display screen of higher priority is hidden by the error display screen.

[Third Embodiment]

A description is given below of a third embodiment. According to the above-described first and second embodiments, in response to reception of an error notification from the body part 120, the outside application service 515 immediately transmits the error notification to the third-party application 514. The present invention, however, is not limited to this configuration. For example, the activation status of the third-party application 514 may be determined, and an error summary notification may be transmitted at an appropriate time. A description is given in detail below of the third embodiment.

Figure 12:
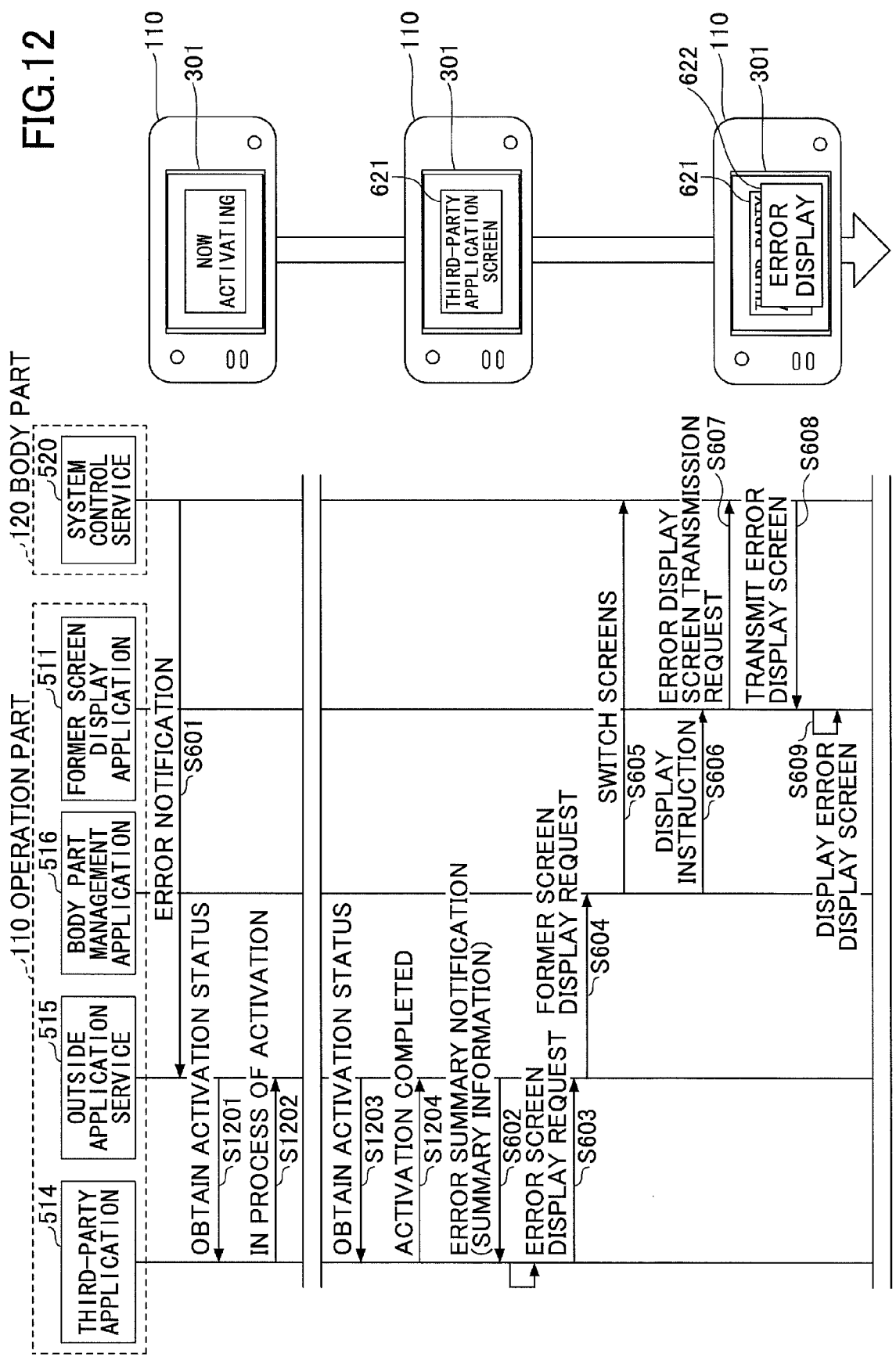
FIG. 12 is a sequence diagram depicting a flow of an error display process in the image processing apparatus according to a third embodiment.

First, a description is given of a flow of an error display process in the image processing apparatus 100 according to this embodiment. FIG. 12 illustrates a sequence diagram depicting a flow of an error display process in the image processing apparatus 100 and a diagram depicting the contents of display of the display and operation part 301.

When an error occurs in the body part 120 during the activation of the third-party application 514, at step S601, the system control service 520 of the body part 120 transmits an error notification to the outside application service 515.

In response to reception of the error notification, at step S1201, the outside application service 515 transmits a query about the activation status to the third-party application 514. If a notification indicating that the third-party application 514 is in the process of activation is received as a result of the query, at step S1203, the outside application service 515 transmits another query about the activation status without transmitting an error summary notification. The query is repeated until a notification indicating the completion of the activation is received.

When the third-party application 514 is activated, the display screen 621 is displayed on the display and operation part 301, and at step S1204, a notification indicating the completion of the activation is transmitted in response to the query from the outside application service 515.

In response to reception of the notification indicating the completion of the activation of the third-party application 514 as a result of the query, at step S602, the outside application service 515 transmits an error summary notification to the third-party application 514.

The subsequent process of steps S603 to S609 is the same as a corresponding process in FIG. 6, and accordingly, its description is omitted.

Figure 13:
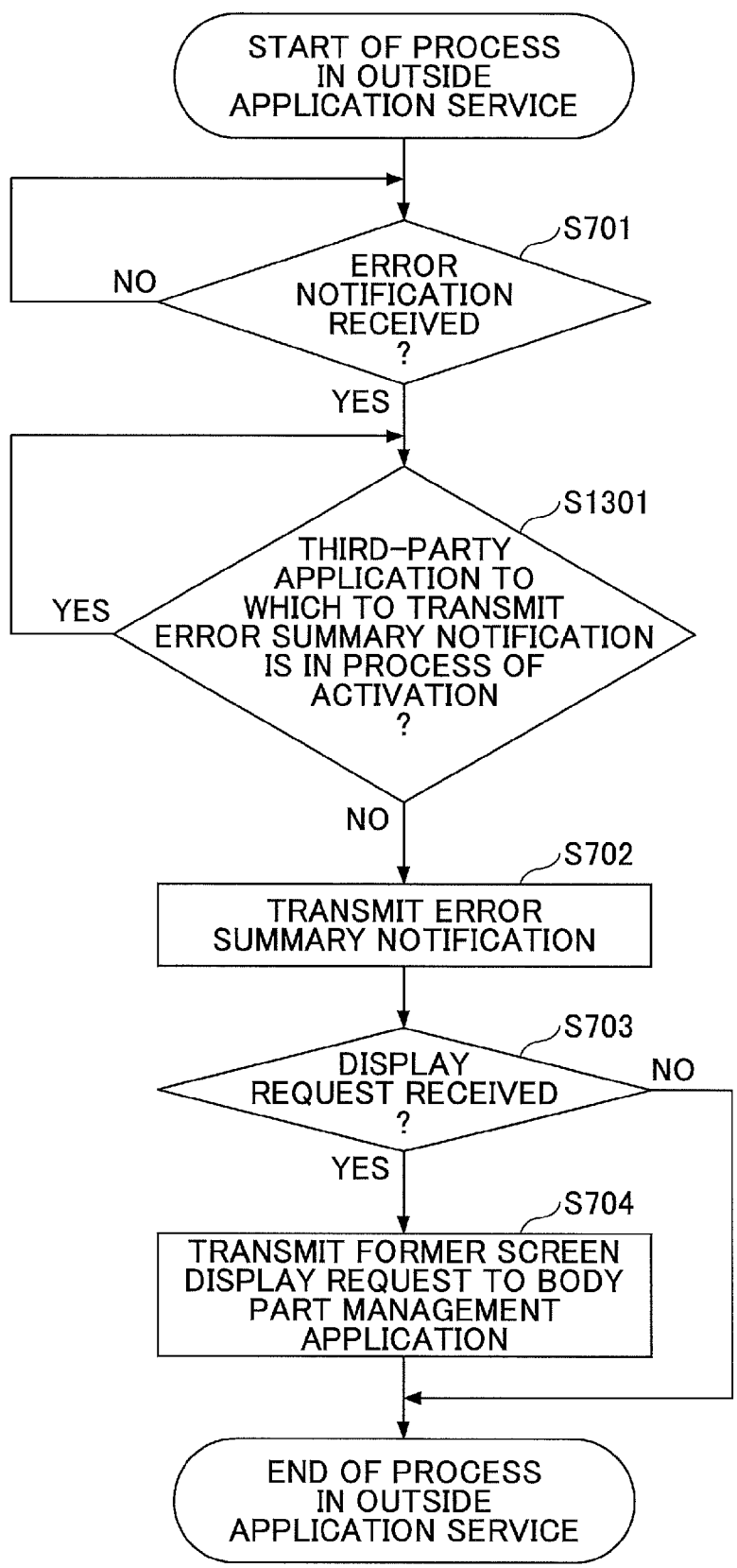
FIG. 13 is a flowchart illustrating a flow of a process in the outside application service of the operation part at the time of the execution of the error display process according to the third embodiment.

Next, a description is given of a flow of a process in the outside application service 515 at the time of the execution of the error display process illustrated in FIG. 12. FIG. 13 is a flowchart illustrating a flow of a process in the outside application service 515 at the time of the execution of the error display process illustrated in FIG. 12.

At step S701, it is determined whether an error notification has been transmitted from the system control service 520 of the body part 120. If it is determined at step S701 that no error notification has been transmitted (NO at step S701), the outside application service 515 waits for transmission of an error notification. On the other hand, if it is determined that an error notification has been transmitted (YES at step S701), the process proceeds to step S1301.

At step S1301, it is determined whether the third-party application 514 to which an error summary notification is to be transmitted is in the process of activation. For example, the outside application service 515 queries the third-party application 514 to which an error summary notification is to be transmitted about the activation status. In response to reception of a notification indicating that the third-party application 514 is in the process of activation as a result of the query, the outside application service 515 determines that the third-party application 514 is in the process of activation, and waits. On the other hand, in response to reception of a notification indicating that the activation of the third-party application 514 is completed as a result of the query, the outside application service 515 determines that the activation of the third-party application 514 is completed, and the process proceeds to step S702. The subsequent process of steps S702 to S704 is the same as a corresponding process in FIG. 7, and accordingly, its description is omitted.

As is clear from the above description, according to the operation part (information processing apparatus) 110 of this embodiment, compared with the above-described first embodiment, an error summary notification is transmitted in accordance with the activation status of the third-party application 514 in response to reception of an error notification.

As a result, it is possible to avoid a situation where an error display screen is not displayed because of the third-party application 514's failure to receive the error summary notification.

[Fourth Embodiment]

A description is given of a fourth embodiment. According to the above-described first through third embodiments, in response to reception of an error notification, the outside application service 515 transmits an error summary notification to the third-party application 514 irrespective of the level of the error. The present invention, however, is not limited to this configuration.

For example, the error summary notification may be transmitted to the third-party application 514 only when the level of the error is high. By thus limiting the kind of the summary information to be reported, it is possible to reduce the number of times of determining the necessity or unnecessity of display, thus further facilitating the development of the third-party application 514 by the third-party vendor.

Figure 14:
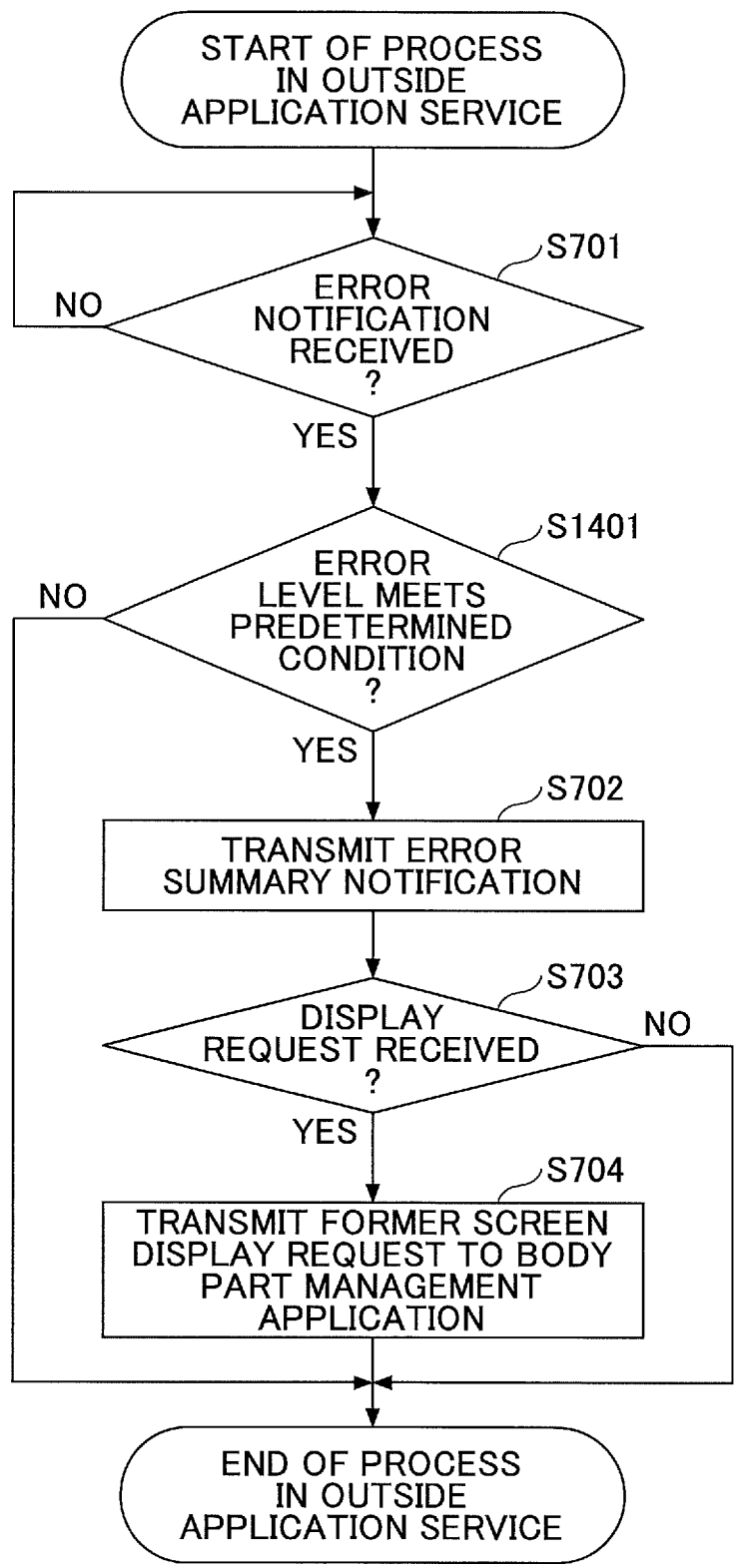
FIG. 14 is a flowchart illustrating a flow of a process in the outside application service of the operation part at the time of the execution of an error display process according to a fourth embodiment.

FIG. 14 is a flowchart illustrating a flow of a process in the outside application service 515 at the time of the execution of an error display process in the image processing apparatus 100 according to this embodiment.

At step S701, it is determined whether an error notification has been transmitted from the system control service 520 of the body part 120. If it is determined at step S701 that no error notification has been transmitted (NO at step S701), the outside application service 515 waits for transmission of an error notification. On the other hand, if it is determined that an error notification has been transmitted (YES at step S701), the process proceeds to step S1401.

At step S1401, the level of the received error notification is determined. If the level of the received error notification meets a predetermined condition (for example, if the level of the received error notification is at or above a predetermined threshold), the process proceeds to step S702, where the outside application service 515 transmits an error summary notification to the third-party application 514. On the other hand, if the level of the received error notification does not meet a predetermined condition (for example, if the level of the received error notification is below a predetermined threshold), the process ends without transmission of an error summary notification to the third-party application 514.

For example, the level of the received error notification is at or above a predetermined threshold when the error has occurred during the execution of a job related to the third-party application 514 to which an error summary notification is to be transmitted.

To be more specific, when the third-party application 514 to which an error summary notification is to be transmitted relates to a printer function and the error that has occurred is an error during the execution of a print job, the level of the error notification is determined to be at or above a predetermined threshold. In this case, the outside application service 515 transmits an error summary notification to the third-party application 514.

On the other hand, when the third-party application 514 to which an error summary notification is to be transmitted relates to a scanner function and the error that has occurred is an error during the execution of a print job, the level of the error notification is determined to be below a predetermined threshold. In this case, the outside application service 515 transmits no error summary notification to the third-party application 514.

[Fifth Embodiment]

A description is given of a fifth embodiment. According to the above-described first through fourth embodiments, when an error summary notification is transmitted and the third-party application 514 determines that it is necessary to display an error display screen, the former screen display application 511 displays an error display screen. That is, the third-party application 514 does not display an error display screen. The present invention, however, is not limited to this configuration, and with respect to part of the error that has occurred, the third-party application 514 may display an error display screen without using the error display function and the error display screen of the former screen display application 511.

In this case, compared with the case where the third-party application 514 does not display an error display screen at all, the operational load of the development of the third-party application 514 by the third-party vendor increases. For the third-party vendor, however, it is possible to provide an original error display screen with respect to particular errors.

Figure 15:
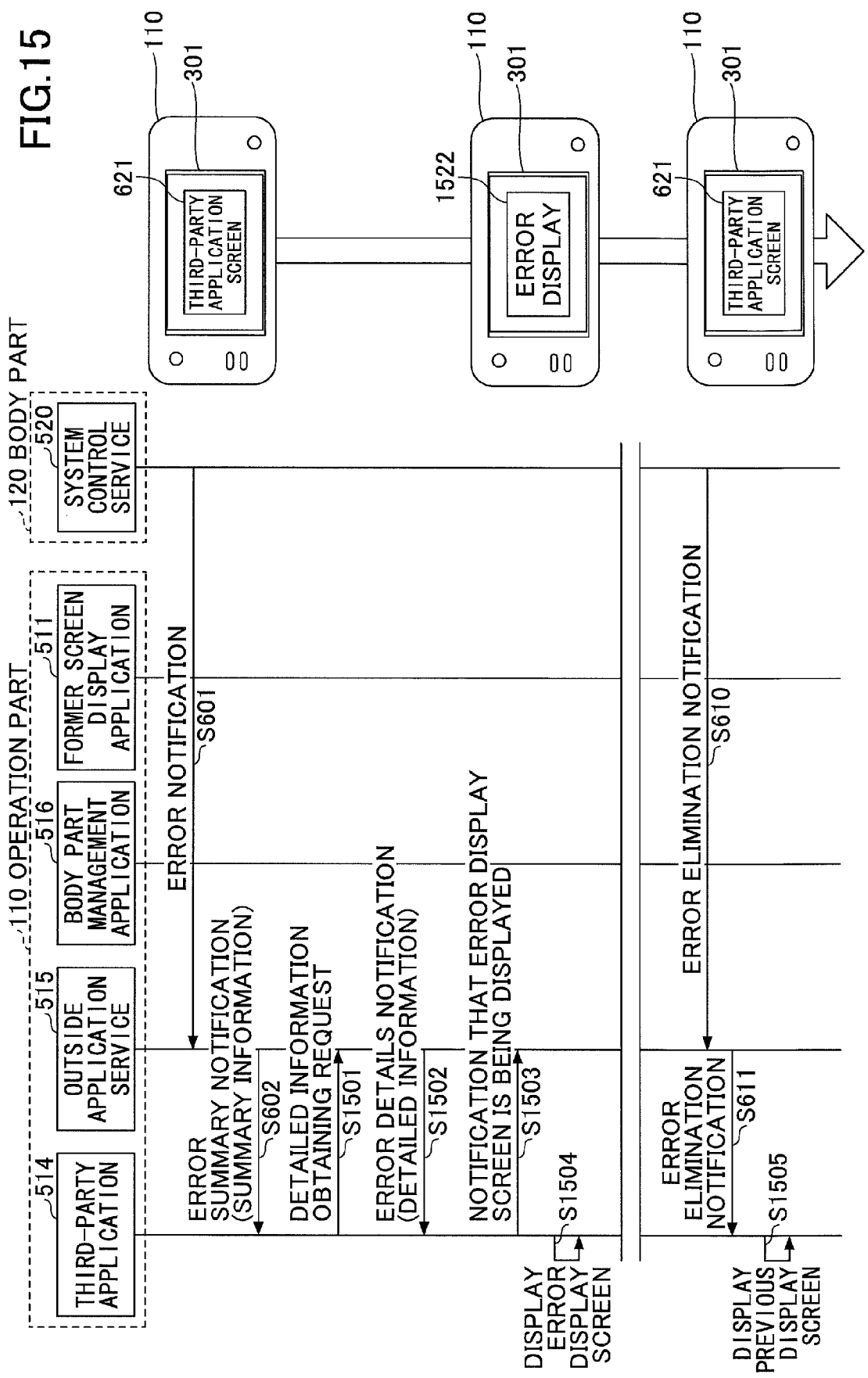
FIG. 15 is a sequence diagram depicting a flow of an error display process in the image processing apparatus according to a fifth embodiment.

First, a description is given of a flow of an error display process in the image processing apparatus 100 according to this embodiment. FIG. 15 illustrates a sequence diagram depicting a flow of an error display process in the image processing apparatus 100 and a diagram depicting the contents of display of the display and operation part 301. In the sequence diagram illustrated in FIG. 15, the process of steps S601 and S602 is the same as a corresponding process in FIG. 6. Accordingly, its description is omitted.

In response to reception of an error summary notification from the outside application service 515, the third-party application 514 determines, based on the summary information, whether to display an error display screen possessed by the third-party application 514.

The process in the case of determining that not an error display screen possessed by the third-party application 514 but an error display screen possessed by the body part 120 be used is the same as the process at and after step S603 in FIG. 6, and accordingly, its description is omitted.

On the other hand, it is assumed that the third-party application 514 is configured to request the detailed information in the case of determining that an error display screen possessed by the third-party application 514 be displayed.

In response to reception of a request for obtaining of the detailed information from the third-party application 514 (step S1501), at step S1502, the outside application service 515 transmits an error details notification including the detailed information of the error notification to the third-party application 514.

In response to reception of the error details notification, at step S1504, the third-party application 514 displays an error display screen 1522 based on the detailed information included in the error details notification. Furthermore, at step S1503, the third-party application 514 transmits a notification indicating that the error display screen 1522 is being displayed to the outside service application 515.

When the elimination of the error that has occurred is detected in the body part 120, at step S610, the system control service 520 of the body part 120 transmits an error elimination notification to the outside application service 515.

In response to reception of the error elimination notification, at step S611, the outside application service 515 transfers the error elimination notification to the third-party application 514. In response to reception of the error elimination notification, at step S1505, the third-party application 514 terminates the error display screen 1522, so that the previous display screen 621 returns.

Figure 16:
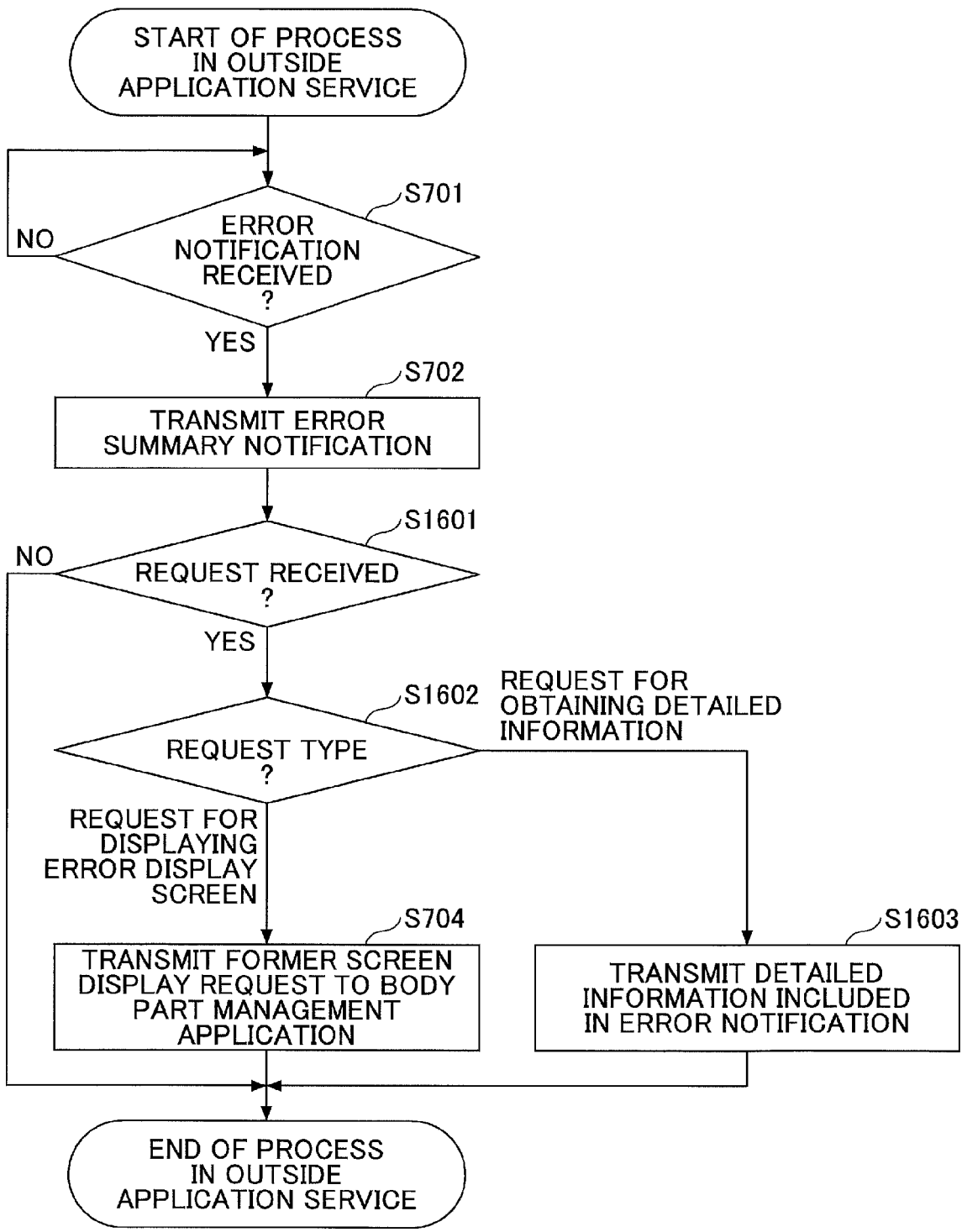
FIG. 16 is a flowchart illustrating a flow of a process in the outside application service of the operation part at the time of the execution of the error display process according to the fifth embodiment.

A description is given of a flow of a process in the outside application service 515 at the time of the execution of the error display process illustrated in FIG. 15. FIG. 16 is a flowchart illustrating a flow of a process in the outside application service 515 at the time of the execution of the error display process illustrated in FIG. 15.

In the flowchart illustrated in FIG. 16, the process of steps S701 and S702 is the same as a corresponding process in FIG. 7. Accordingly, its description is omitted.

After transmitting the error summary notification to the third-party application 514, at step S1601, the outside application service 515 waits for a request from the third-party application 514, and when receiving a request, at step S1602, the outside application service 515 determines the type of the request.

When the outside application service 515 determines as a result of the determination at step S1602 that a request for display of an error display screen has been received, the process proceeds to step S704. At step S704, the outside application service 515 transmits a former screen display request to the body part management application 516.

On the other hand, when the outside application service 515 determines as a result of the determination at step S1602 that a request for obtaining of the detailed information included in the error notification has been received from the third-party application 514, the process proceeds to step S1603.

At step S1603, the outside application service 515 extracts the detailed information included in the error notification, and transmits an error details notification to the third-party application 514.

As is clear from the above description, according to the operation part (information processing apparatus) 110 of this embodiment, compared with the above-described first embodiment, it is additionally made possible to transmit the detailed information included in the error notification to the third-party application 514 in accordance with the contents of the request of the third-party application 514 responsive to the error summary notification.

As a result, it is possible for the third-party vendor to provide an original error display screen with respect to particular errors.

[Sixth Embodiment]

A description is given of a sixth embodiment. According to the above-described first through fifth embodiments, in response to reception of a request for display of an error display screen from the third-party application 514, an error display screen and an error display function of a model older than the image processing apparatus 100 are used. The present invention, however, is not limited to this configuration.

For example, the latest error display screen displayed by a newly installed manufacturer application 513 and its latest error display function may be used. A description is given in detail below of the sixth embodiment.

First, a description is given of a flow of an error display process in the image processing apparatus 100. FIG. 17 illustrates a sequence diagram depicting a flow of an error display process in the image processing apparatus 100 and a diagram depicting the contents of display of the display and operation part 301. In the sequence diagram illustrated in FIG. 17, the process of steps S601 to S603 is the same as a corresponding process in FIG. 6. Accordingly, its description is omitted.

In response to reception of the error screen display request, the outside application service 515 determines whether the latest error display screen is available. If it is determined that no latest error display screen is available, the outside application service 515 transmits a former screen display request to the body part management application 516. The process in this case is the same as the process at and after step S604 in FIG. 6, and accordingly, its description is omitted.

On the other hand, if it is determined that the latest error display screen is available, at step S1701, the outside application service 515 transmits a latest screen display request to the body part management application 516, requesting display of the latest error screen. In response to reception of the latest screen display request, at step S605, the body part management application 516 transmits an instruction to switch display screens to the system control service 520 of the body part 120. Furthermore, at step S1703, the body part management application 516 instructs the manufacturer application 513 to perform display.

In response to reception of the display instruction, at step S1704, the manufacturer application 513 displays a latest error display screen 1722 corresponding to the error that has occurred in place of the display screen 621 of the third-party application 514.

Next, a description is given of a flow of a process in the outside application service 515 at the time of the execution of the error display process illustrated in FIG. 17. FIG. 18 is a flowchart illustrating a flow of a process in the outside application service 515 at the time of the execution of the error display process illustrated in FIG. 17.

In the flowchart illustrated in FIG. 18, the process of steps S701 to S703 is the same as a corresponding process in FIG. 7. Accordingly, its description is omitted.

In response to reception of the error screen display request from the third-party application 514, at step S1801, it is determined whether the latest error display screen is available. If it is determined at step S1801 that no latest error display screen is available (NO at step S1801), the process proceeds to step S704. At step S704, the outside application service 515 transmits a former display screen request to the body part management application 516.

On the other hand, if it is determined at step S1801 that the latest error display screen is available (YES at step S1801), the process proceeds to step S1802. At step S1802, the outside application service 515 requests the body part management application 516 to display the latest error display screen.

Thus, by causing the outside application service 515 to serve as a selector that selects either the manufacturer application 513 or the third-party application 514, it is possible to display an optimal error display screen.

As is clear from the above description, according to the operation part (information processing apparatus) 110 of this embodiment, compared with the above-described first embodiment, it is additionally made possible to use not only an error display screen and an error display function of a model older than the image processing apparatus 100 but also the latest error display screen and error display function newly installed in the image processing apparatus 100.

As a result, it is possible to display an optimal error display screen in the case of the occurrence of an error during the activation of the third-party application 514.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. An information processing system, apparatus, and method are described above based on one or more embodiments of the present invention have been described in detail, it should be understood that the various changes, substitutions, and alterations could be made hereto without departing from the spirit and scope of the invention.

What is claimed is:

1. An information processing apparatus, comprising:
an operation part operated by a user to select and execute a function; and
a body part that executes the function based on an operation of the operation part by the user,
wherein the operation part and the body part are controlled by respective operating systems so as to operate independent of each other, and
wherein the operation part includes
a processor; and
a memory storing a program that, when executed by the processor, causes the operation part to
transmit information to an application that is installed in the operation part, said information being for determining whether to display an error screen, when the operation part receives an error notice from the body part during execution of the application;
request display of the error display screen in response to a display request from the application, the display request being transmitted from the application when the application receives said information during the execution thereof; and obtain the error display screen stored in the body part and display the obtained error display screen when the display of the error display screen is requested.

2. The information processing apparatus as claimed in claim 1, wherein the operation part is further caused to transmit said information for determining whether to display the error display screen after completion of activation of the installed application, when the operation part receives the error notice from the body part during the activation of the installed application.

3. The information processing apparatus as claimed in claim 1, wherein the operation part is further caused to determine a level of an error based on the received error notice, and transmit said information for determining whether to display the error display screen when the level of the error meets a predetermined condition.

4. The information processing apparatus as claimed in claim 1, wherein the operation part is further caused to determine whether a display screen higher in priority than the error display screen is displayed in response to the display request, and request the display of the error display screen in response to determining that the display screen higher in priority than the error display screen is not displayed.

5. The information processing apparatus as claimed in claim 1,
wherein the application determines whether to display the error display screen stored in the body part or an error display screen of the application, based on said information for determining whether to display the error display screen, and
wherein the operation part is further caused to, when the application determines to display the error display screen of the application, transmit detailed information included in the error notice to the application during the execution thereof, in response to a request for obtaining of the detailed information, the request for the obtaining being transmitted from the application when the application receives said information for determining whether to display the error display screen during the execution thereof, and
when the application determines to display the error display screen stored in the body part, request the display of the error display screen stored in the body part.

6. The information processing apparatus as claimed in claim 1, wherein the operation part is further caused to, when the display of the error display screen is requested,
determine whether an error display screen other than the error display screen stored in the body part is available from the operation part,
select an application for displaying the error display screen in the operation part and request the display of the error display screen other than the error display screen stored in the body part by activating the selected application in response to determining that the error display screen other than the error display screen stored in the body part is available from the operation part, and
obtain the error display screen stored in the body part and display the obtained error display screen in response to determining that the error display screen other than the error display screen stored in the body part is not available from the operation part.

7. The information processing apparatus as claimed in claim 1, wherein said information for determining whether to display the error display screen includes information indicating a type of the error.

8. The information processing apparatus as claimed in claim 1, wherein the error display screen is stored in the body part before the application is installed in the operation part.

9. The information processing apparatus as claimed in claim 1, wherein the application installed in the operation part is provided by a third-party vendor different from a manufacturer of the information processing apparatus.

10. An information processing system including a plurality of apparatuses connected so as to communicate with each other, the information processing system comprising:
an operation part operated by a user to select and execute a function; and
a body part that executes the function based on an operation of the operation part by the user,
wherein the operation part and the body part are controlled by respective operating systems so as to operate independent of each other, and
wherein the operation part includes
a processor; and
a memory storing a program that, when executed by the processor, causes the operation part to
transmit information to an application that is installed in the operation part, said information being for determining whether to display an error screen, when the operation part receives an error notice from the body part during execution of the application;
request display of the error display screen in response to a display request from the application, the display request being transmitted from the application when the application receives said information during the execution thereof; and
obtain the error display screen stored in the body part and display the obtained error display screen when the display of the error display screen is requested.

11. An information processing method in an information processing apparatus, the information processing apparatus including an operation part operated by a user to select and execute a function and a body part that executes the function based on an operation of the operation part by the user, wherein the operation part and the body part are controlled by respective operating systems so as to operate independent of each other, and the operation part includes a processor and a memory storing a program that, when executed by the processor, causes the operation part to execute the information processing method, the information processing method comprising:
transmitting information to an application that is installed in the operation part, said information being for determining whether to display an error screen, when the operation part receives an error notice from the body part during execution of the application;
requesting display of the error display screen in response to a display request from the application, the display request being transmitted from the application when the application receives said information during the execution thereof; and
obtaining the error display screen stored in the body part and displaying the obtained error display screen when the display of the error display screen is requested.

\* \* \* \* \*